(12) United States Patent
Hikosaka

(10) Patent No.: US 8,207,288 B2
(45) Date of Patent: Jun. 26, 2012

(54) POLYCARBONATE POLYMER, COATING LIQUID, AND ELECTROPHOTOGRAPHIC PHOTOSENSITIVE BODY

(75) Inventor: Takaaki Hikosaka, Chiba (JP)

(73) Assignee: Idemitsu Kosan Co., Ltd., Tokyo (JP)

( * ) Notice: Subject to any disclaimer, the term of this patent is extended or adjusted under 35 U.S.C. 154(b) by 326 days.

(21) Appl. No.: 12/599,078

(22) PCT Filed: May 7, 2008

(86) PCT No.: PCT/JP2008/058473
§ 371 (c)(1),
(2), (4) Date: Nov. 6, 2009

(87) PCT Pub. No.: WO2008/136521
PCT Pub. Date: Nov. 13, 2008

(65) Prior Publication Data
US 2010/0233603 A1 Sep. 16, 2010

(30) Foreign Application Priority Data

May 8, 2007 (JP) ................................. 2007-123907
May 14, 2007 (JP) ................................. 2007-128583
May 24, 2007 (JP) ................................. 2007-138181

(51) Int. Cl.
C08G 64/00 (2006.01)
C08G 63/02 (2006.01)

(52) U.S. Cl. ........ 528/196; 430/57.1; 430/59.6; 430/66; 528/198

(58) Field of Classification Search ................ 430/57.1, 430/59.6, 66; 528/196, 198
See application file for complete search history.

(56) References Cited

U.S. PATENT DOCUMENTS

| 6,165,662 | A | 12/2000 | Kato et al. | |
|---|---|---|---|---|
| 7,550,552 | B2 * | 6/2009 | Yamamoto et al. | 528/271 |
| 2002/0061997 | A1 | 5/2002 | Kanagawa et al. | |
| 2005/0187372 | A1 | 8/2005 | Venderbosch et al. | |

FOREIGN PATENT DOCUMENTS

| CN | 1751096 A | 3/2006 |
|---|---|---|
| EP | 0 526 878 | 2/1993 |
| EP | 1 097 956 | 5/2001 |
| JP | 61-132954 A | 6/1986 |
| JP | 2-240655 A | 9/1990 |
| JP | 5-72753 A | 3/1993 |
| JP | 6-220181 A | 8/1994 |
| JP | 2933435 B2 | 5/1999 |
| JP | 2000-171989 A | 6/2000 |
| JP | 2002-30140 A | 1/2002 |
| JP | 3350617 B2 | 9/2002 |
| JP | 3606074 B2 | 10/2004 |
| JP | 2006-518803 A | 8/2006 |
| JP | 2006-523243 A | 10/2006 |
| JP | 2007-199688 A | 8/2007 |
| JP | 2008-102196 A | 5/2008 |
| WO | WO 2005/113638 A1 | 12/2005 |

OTHER PUBLICATIONS

International Search Report of PCT/JP2008/058473 (Jul. 28, 2008).
Office Action of Chinese Patent Application No. 200880015166.3 (May 17, 2011).
European Search Report for EP 08 75 2365 dated Nov. 3, 2011.

* cited by examiner

*Primary Examiner* — Terressa Boykin
(74) *Attorney, Agent, or Firm* — Millen, White, Zelano & Branigan, P.C.

(57) ABSTRACT

A polycarbonate polymer includes: a monomer unit represented by a formula (1A) below; and a monomer unit represented by a formula (2). A haze of a solution that is obtained by dissolving the polycarbonate polymer in THF (tetrahydrofuran) at a concentration of 10 mass % is 5% or less (according to JIS K7105, optical path length of 10 mm).

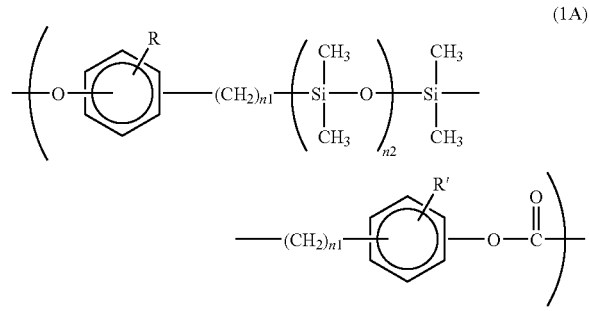

In the formula (1A), R and R' each independently represent a hydrogen atom, a halogen atom, an alkyl group having 1 to 12 carbon atoms or a substituted or unsubstituted aryl group having 6 to 12 carbon atoms; $n1$ is an integer in a range of 2 to 4; and $n2$ is an integer in a range of 25 to 220; and

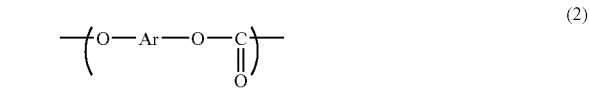

in the formula (2), Ar represents a divalent aromatic group.

25 Claims, No Drawings

POLYCARBONATE POLYMER, COATING LIQUID, AND ELECTROPHOTOGRAPHIC PHOTOSENSITIVE BODY

TECHNICAL FIELD

The present invention relates to a polycarbonate polymer, a coating liquid using the same and an electrophotographic photoreceptor.

BACKGROUND ART

A known polycarbonate resin produced from 2,2-bis(4-hydroxyphenyl)propane (commonly named as bisphenol A), which has high transparency and excellent mechanical properties, has been used for various application such as an optical material and an electronic material. For instance, recently, the polycarbonate resin has been widely used for an electrophotographic photoreceptor.

Repeated operations such as corona electrification or contact electrification using a roller and a brush, toner development, transfer onto paper, cleaning and the like are applied on a surface of a photosensitive layer of the electrophotographic photoreceptor. At every operation, electrical and external forces are applied on the surface of the photosensitive layer. Accordingly, in order to maintain electrophotography image quality for a long period of time, the photosensitive layer provided on the surface of the electrophotographic photoreceptor is required to have durability against these external forces. Durability against surface wear and scratch by friction and surface deterioration due to corona electrification or contact electrification, active gas such as ozone during transfer and discharge is particularly required.

To meet such a demand, a polycarbonate resin, which has good compatibility with charge transport materials used for the photosensitive layer and good optical properties, has been used as a binder resin of the electrophotographic photoreceptor. However, such a typical polycarbonate resin produced from bisphenol A described above and 1,1-bis(4-hydroxyphenyl)cyclohexane (bisphenol Z) is insufficient to satisfy the above demand.

Accordingly, in order to solve the above problem, an electrophotographic photoreceptor containing a polycarbonate provided with a siloxane bond at a main chain or a terminal end has been suggested (see, for instance, Patent Documents 1 to 7).
Patent Document 1: JP-A-61-132954
Patent Document 2: JP-A-2-240655
Patent Document 3: Japanese Patent No. 2933435
Patent Document 4: JP-A-6-220181
Patent Document 5: JP-A-5-072753
Patent Document 6: Japanese Patent No. 3350617
Patent Document 7: WO2005/113638 (Japanese Patent Application No. 2004-150295)
Patent Document 8: Japanese Patent No. 3606074

DISCLOSURE OF THE INVENTION

Problems to be Solved by the Invention

However, polycarbonate polymers disclosed in Patent Documents 1 and 2, which are bonded to each other via a chemically unstable Si—O—C bond, may have disadvantages such as degradation of mechanical properties by molecular chain cleavage and degradation of photoconductor characteristics by a remained silanol group at a molecular terminal end. In order to solve the above problem, Patent Documents 3 to 7 suggest polycarbonate polymers bonded to each other via a chemically stable Si—C bond. However, though photoconductor characteristics are improved, an electrophotographic photoreceptor using the polycarbonate polymers cannot provide a sufficient effect to improve scratch resistance. In order to solve the above problem, Patent Document 6 discloses a polycarbonate resin having a polysiloxane structure bonded with a chemically stable Si—C bond as a terminal group.

Patent Document 8 discloses a technique to apply a resin similar to the polycarbonate polymer (resin) of the present invention to a binder resin in the photosensitive layer of the electrophotographic photoreceptor. However, since the number of repeating units of polysiloxane sites is small, such technique cannot provide a sufficient effect to improve scratch resistance.

Accordingly, an object of the invention is to provide a polycarbonate polymer that can provide excellent scratch resistance and electrical characteristics (e.g., photoconductor characteristics), a coating liquid containing the polycarbonate polymer and an electrophotographic photoreceptor using the polycarbonate polymer.

Means for Solving the Problems

The inventors have found that the above-mentioned scratch resistance is improved when a substituent in the main chain has a dimethyl structure and the number of repeating units of dimethyl siloxane chain is a predetermined value or more, and that a polycarbonate polymer having such a structure is either uniformly dissolved or whitened when dissolved in a predetermined organic solvent. Further, the inventors have found that the degree of such white turbidity affects scratch resistance and electrical characteristics (e.g., photoconductor characteristics) of the electrophotographic photoreceptor using the polycarbonate polymer, thus reaching the invention.

In other words, the invention provides a polycarbonate polymer, a coating liquid and an electrophotographic photoreceptor as follows.

[1] A polycarbonate polymer including a monomer unit represented by a formula (1A) below and a monomer unit represented by a formula (2) in which a haze of a solution that is obtained by dissolving the polycarbonate polymer in THF (tetrahydrofuran) at a concentration of 10 mass % is 5% or less (according to JIS K7105, optical path length of 10 mm).

[Chemical Formula 1]

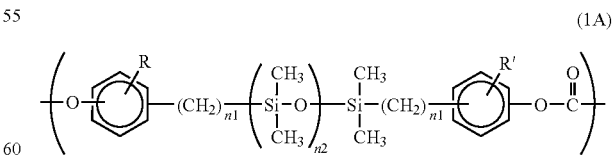

(1A)

In the formula, R and R' each independently represent a hydrogen atom, a halogen atom, an alkyl group having 1 to 12 carbon atoms or a substituted or unsubstituted aryl group having 6 to 12 carbon atoms; n1 is an integer in a range of 2 to 4; and n2 is an integer in a range of 25 to 700; and

[Chemical Formula 2]

(2)

In the formula, Ar represents a divalent aromatic group.

[2] A polycarbonate polymer including a monomer unit represented by a formula (1B) below and a monomer unit represented by a formula (2) in which a haze of a solution that is obtained by dissolving the polycarbonate polymer in THF (tetrahydrofuran) at a concentration of 10 mass % is 5% or less (according to JIS K7105, optical path length of 10 mm).

[Chemical Formula 3]

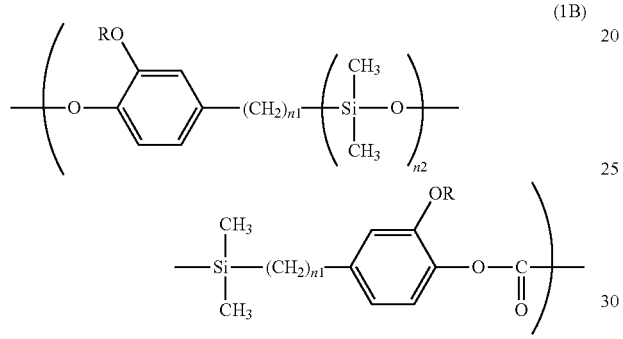

(1B)

In the formula, R represents an alkyl group having 1 to 3 carbon atoms; n1 is an integer in a range of 2 to 4; and n2 is an integer in a range of 55 to 700.

[Chemical Formula 4]

(2)

In the formula, Ar represents a divalent aromatic group.

[3] The polycarbonate polymer according to the above [1] or [2], in which a haze of a solution that is obtained by dissolving the polycarbonate polymer in THF (tetrahydrofuran) at a concentration of 25 mass % is 10% or less.

[4] The polycarbonate polymer according to any one of the above [1] to [3], in which Ar in the formula (2) contains a functional group represented a formula (3A) below.

[Chemical Formula 5]

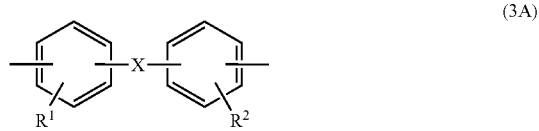

(3A)

In the formula, $R^1$ and $R^2$ each independently represent a functional group selected from the group consisting of hydrogen, a trifluoromethyl group, a halogen atom, an alkyl group having 1 to 10 carbon atoms, an aryl group having 6 to 12 carbon atoms, a cycloalkyl group having 3 to 12 carbon atoms, an alkoxy group having 1 to 6 carbon atoms and an aryloxy group having 6 to 12 carbon atoms; and X represents a functional group selected from the group consisting of a single bond, —O—, —S—, —SO—, —SO$_2$—, —CO—, —CR$^3$R$^4$— (in which $R^3$ and $R^4$ each independently represent a functional group selected from the group consisting of a hydrogen atom, a trifluoromethyl group, a substituted or unsubstituted alkyl group having 1 to 10 carbon atoms and a substituted or unsubstituted aryl group having 6 to 12 carbon atoms), a substituted or unsubstituted cycloalkylidene group having 5 to 11 carbon atoms, a substituted or unsubstituted α,ω-alkylene group having 2 to 12 carbon atoms, a substituted or unsubstituted 9,9-fluorenylidene group, a substituted or unsubstituted arylene group having 6 to 12 carbon atoms, a divalent functional group derived from terpenes represented by a formula (4A) below, and alkylidene-arylene-alkylidene group having 8 to 16 carbon atoms represented by a formula (5A) below.

[Chemical Formula 6]

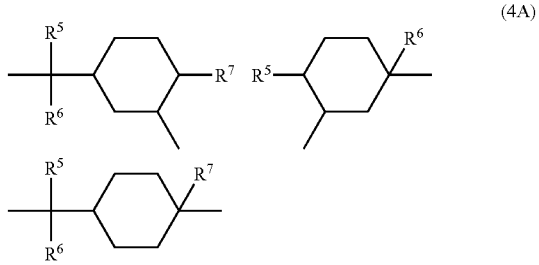

(4A)

In the formula, $R^5$ to $R^7$ each represent the same functional group as $R^1$ and $R^2$.

[Chemical Formula 7]

(5A)

In the formula, $R^8$ to $R^{11}$ each represent the same functional group as $R^1$ and $R^2$.

The polycarbonate polymer according to the above [4], in which X in the formula (3A) represents a functional group selected from the group consisting of —CR$^3$R$^4$—, a single bond, a substituted or unsubstituted cycloalkylidene group having 5 to 11 carbon atoms and a substituted or unsubstituted 9,9-fluorenylidene group.

[6] The polycarbonate polymer according to the above [4] or [5], in which the functional group represented by the above formula (3A) is (A) a combination of a functional group in which X is a single bond and a functional group in which X is not a single bond, (B) a combination of a functional group in which X is a substituted or unsubstituted cycloalkylidene group having 5 to 11 carbon atoms and a functional group in which X is other than a substituted or unsubstituted cycloalkylidene group having 5 to 11 carbon atoms, (C) a combination of a functional group in which X is a substituted or unsubstituted 9,9-fluorenylidene group and a functional group in which X is other than a substituted or unsubstituted 9,9-fluorenylidene group or (D) a combination of a functional group in which X is an alkylidene-arylene-alkylidene group having 8 to 16 carbon atoms and a functional group in which X is other than an alkylidene-arylene-alkylidene group having 8 to 16 carbon atoms.

[7] The polycarbonate polymer according to any one of the above [1] to [6], in which the monomer unit represented by the formula (1A) or (1B) occupies 0.01 to 50 mass % in the total polycarbonate polymer.

[8] A polycarbonate polymer including a monomer unit represented by a formula (2) below and having a structure in which at least one terminal is terminated by a terminal group represented by a formula (1C) below.

[Chemical Formula 8]

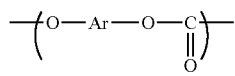

(2)

In the formula, Ar represents a divalent aromatic group.

[Chemical Formula 9]

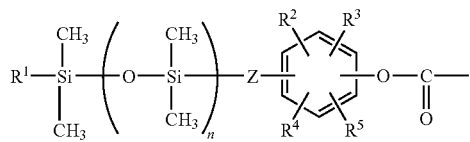

(1C)

In the formula, Z represents an aliphatic hydrocarbon group having 2 to 6 carbon atoms; $R^1$ represents an aliphatic hydrocarbon group having 1 to 6 carbon atoms; $R^2$ to $R^5$ each independently represent a hydrogen atom, an aliphatic hydrocarbon group having 1 to 30 carbon atoms, an alkoxy group having 1 to 6 carbon atoms or an aromatic hydrocarbon group having 6 to 12 carbon atoms; and n is an integer in a range of 40 to 700.

[9] The polycarbonate polymer according to the above [8], in which a haze of a solution that is obtained by dissolving the polycarbonate polymer in THF (tetrahydrofuran) at a concentration of 10 mass % is 5% or less (according to JIS K7105, optical path length of 10 mm).

[10] The polycarbonate polymer according to the above [8] or [9], in which a haze of a solution that is obtained by dissolving the polycarbonate polymer in THF (tetrahydrofuran) at a concentration of 25 mass % is 10% or less.

[11] The polycarbonate polymer according to any one of the above [8] to [10], in which Ar in the formula (2) contains a functional group represented a formula (3B) below.

[Chemical Formula 10]

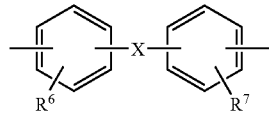

(3B)

In the formula, $R^6$ and $R^7$ each independently represent a functional group selected from the group consisting of hydrogen, a trifluoromethyl group, a halogen atom, an alkyl group having 1 to 10 carbon atoms, an aryl group having 6 to 12 carbon atoms, a cycloalkyl group having 3 to 12 carbon atoms, an alkoxy group having 1 to 6 carbon atoms and an aryloxy group having 6 to 12 carbon atoms; and X represents a single bond, —O—, —S—, —SO—, —$SO_2$—, —CO—, —$CX^1X^2$— (in which $X^1$ and $X^2$ each independently represent a functional group selected from the group consisting of a hydrogen atom, a trifluoromethyl group, a substituted or unsubstituted alkyl group having 1 to 10 carbon atoms and a substituted or unsubstituted aryl group having 6 to 12 carbon atoms), a substituted or unsubstituted cycloalkylidene group having 5 to 11 carbon atoms, a substituted or unsubstituted α,ω-alkylene group having 2 to 12 carbon atoms, a substituted or unsubstituted 9,9-fluorenylidene group, a substituted or unsubstituted arylene group having 6 to 12 carbon atoms, a divalent functional group derived from terpenes represented by a formula (4B) below, and alkylidene-arylene-alkylidene group having 8 to 16 carbon atoms represented by a formula (5B) below. When $X^1$ and $X^2$ are both methyl groups, X is not —$CX^1X^2$— alone.

[Chemical Formula 11]

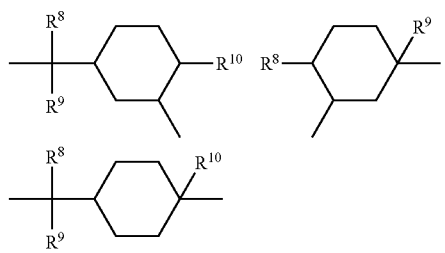

(4B)

In the formula, $R^8$ to $R^{10}$ each represent the same functional group as $R^6$ and $R^7$.

[Chemical Formula 12]

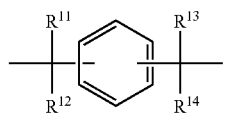

(5B)

In the formula, $R^{11}$ to $R^{13}$ each represent the same functional group as $R^6$ and $R^7$.

[12] The polycarbonate polymer according to the above [11], in which X in the formula (3B) represents a functional group selected from the group consisting of —$CHCH_3$—, —$C(CH_3)C_2H_5$—, a single bond, a substituted or unsubstituted cycloalkylidene group having 5 to 11 carbon atoms and a substituted or unsubstituted 9,9-fluorenylidene group.

[13] The polycarbonate polymer according to the above [11] or [12], in which the functional group represented by the above formula (3B) is (A) a combination of a functional group in which X is a single bond and a functional group in which X is not a single bond, (B) a combination of a functional group in which X is a substituted or unsubstituted cycloalkylidene group having 5 to 11 carbon atoms and a functional group in which X is other than a substituted or unsubstituted cycloalkylidene group having 5 to 11 carbon atoms, (C) a combination of a functional group in which X is a substituted or unsubstituted 9,9-fluorenylidene group and a functional group in which X is other than a substituted or unsubstituted 9,9-fluorenylidene group or (D) a combination of a functional group in which X is an alkylidene-arylene-alkylidene group having 8 to 16 carbon atoms and a functional group in which X is other than an alkylidene-arylene-alkylidene group having 8 to 16 carbon atoms.

[14] The polycarbonate polymer according to any one of the above [8] to [13], in which the monomer unit represented by the formula (1C) occupies 0.01 to 50 mass % in the total polycarbonate polymer.

[15] A coating liquid including the polycarbonate polymer according to any one of the above [1] to [14] and a solvent.

[16] An electrophotographic photoreceptor including the polycarbonate polymer according to any one of the above [1] to [14].

The polycarbonate polymer according to the invention includes a monomer unit represented by the formula (1A) or (1B) and a monomer unit represented by the formula (2) and a haze of a solution that is obtained by dissolving the polycarbonate polymer in THF (tetrahydrofuran) at a concentration of 10 mass % is 5% or less. Alternatively, the polycarbonate polymer according to the invention includes a monomer unit represented by the formula (2) and is terminated at least one end thereof by the terminal group represented by the formula (1C). When such a polycarbonate polymer is used as the binder resin of the photosensitive layer of the electrophotographic photoreceptor, an electrophotographic photoreceptor excellent in durability (scratch resistance) and electrical characteristics such as photoconductor can be provided. Further, the coating liquid formed by the polycarbonate polymer and the solvent exhibits excellent stability for a long term without causing white turbidity or gelation. For instance, application of the coating liquid for forming the photosensitive layer of the electrophotographic photoreceptor can provide an electrophotographic photoreceptor exhibiting excellent electrophotography property and scratch resistance for a long term without causing crystallization of the binder resin in coating.

BEST MODE FOR CARRYING OUT THE INVENTION

First Embodiment

A polycarbonate polymer (hereinafter, occasionally referred to as "copolymerized PC") according to a first exemplary embodiment, a coating liquid using the copolymerized PC, and an electrophotographic photoreceptor formed of wet type molding with use of the coating liquid will be described in detail below.

[Structure of Copolymerized PC]

The copolymerized PC according to this exemplary embodiment includes a monomer unit represented by a formula (1A) below and a monomer unit represented by a formula (2) below.

[Chemical Formula 13]

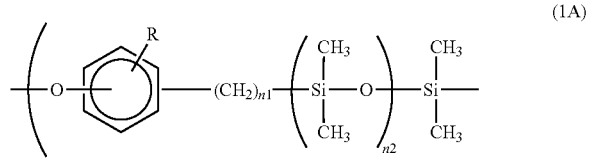

(1A)

-continued

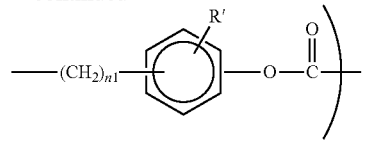

In the formula (1A), R and R' each independently represent a hydrogen atom, a halogen atom, an alkyl group having 1 to 12 carbon atoms or a substituted or unsubstituted aryl group having 6 to 12 carbon atoms; n1 is an integer in a range of 2 to 4; and n2 is an integer in a range of 25 to 700.

[Chemical Formula 14]

(2)

In the formula (2), Ar represents a divalent aromatic group.

According to this exemplary embodiment, a haze of a solution that is obtained by dissolving the copolymerized PC in THF (tetrahydrofuran) at a concentration of 10 mass % is 5% or less (according to JIS K7105, optical path length of 10 mm). Moreover, a haze of a solution that is obtained by dissolving the copolymerized PC in THF at a concentration of 25 mass % is preferably 10% or less.

Such a copolymerized PC that exhibits a high haze in the above predetermined solution, in other words, causes white turbidity when dissolved in THF may be obtained when a monomer corresponding to the formula (1A) (e.g., a formula (6A) below) is nonuniformly copolymerized with a monomer corresponding to the formula (2) (e.g., a formula (7) below). Alternatively, the above copolymerized PC may be obtained when a siloxane part thereof forms a domain and the copolymerized PC is not uniform as a whole, even though those monomers are uniformly copolymerized. In the copolymerized PC having such a nonuniform structure, for example when the copolymerized PC is wet-molded and used as the binder resin for the electrophotographic photoreceptor, the nonuniform part becomes a trap-site at charge-transfer, thereby deteriorating electrical characteristics (e.g., photoconductor characteristics) of the electrophotographic photoreceptor. On the other hand, when n2 in the formula (1A) above is small, i.e., siloxane chain length is short, scratch resistance of the electrophotographic photoreceptor is reduced.

In the copolymerized PC according to this exemplary embodiment, it is preferable that Ar in the formula (2) includes at least one of functional groups represented by a formula (3A) below.

[Chemical Formula 15]

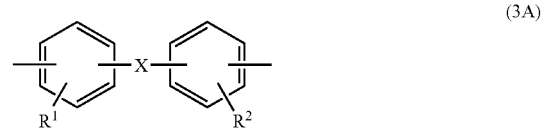

(3A)

In the formula (3A), $R^1$ and $R^2$ are each independently a functional group selected from the group consisting of the group consisting of hydrogen; a trifluoromethyl group; a halogen atom; an alkyl group having 1 to 10 carbon atoms; an aryl group having 6 to 12 carbon atoms; an alkyl group having 3 to 12 carbon atoms, preferably 1 to 6 carbon atoms; an aryl group having 6 to 12 carbon atoms, preferably 6 to 10 carbon atoms; an cycloalkyl group having 3 to 12 carbon atoms, preferably 5 to 9 carbon atoms; an alkoxy group having 1 to 6 carbon atoms and an aryloxy group having 6 to 12 carbon atoms, preferably 6 to 10 carbon atoms. Examples of the halogen atom are fluorine, chlorine, bromine and iodine. Examples of the alkyl group having 1 to 10 carbon atoms are a methyl group, ethyl group, n-propyl group, isopropyl group, n-butyl group, isobutyl group, sec-butyl group, tert-butyl group, pentyl groups, hexyl groups, heptyl groups, octyl groups and 2-methoxyethyl group. Examples of the aryl group having 6 to 12 carbon atoms are a phenyl group, tolyl group and xylyl group. Examples of the cycloalkyl group having 3 to 12 carbon atoms are a cyclopropyl group, cyclobutyl group, cyclopentyl group and cyclohexyl group. Examples of the alkoxy group having 1 to 6 carbon atoms are a methoxy group, ethoxy group, n-propoxy group, isopropoxy group, n-butoxy group, isobutoxy group, sec-butoxy group, tert-butoxy group and pentoxy groups. Examples of the aryloxy group having 6 to 12 carbon atoms are a phenoxy group, 2,6-dimethylphenoxy group and naphthyloxy group.

In the formula (3A), X represents a functional group selected from the group consisting of: a single bond; —O—; —S—; —SO—; —SO$_2$—; —CO—; —CR$^3$R$^4$— (in which R$^3$ and R$^4$ each independently represent a functional group selected from the group consisting of a hydrogen atom, a trifluoromethyl group, a substituted or unsubstituted alkyl group having 1 to 10 carbon atoms and a substituted or unsubstituted aryl group having 6 to 12 carbon atoms); a substituted or unsubstituted cycloalkylidene group having 5 to 11 carbon atoms, preferably 5 to 9 carbon atoms; a substituted or unsubstituted α,ω-alkylene group having 2 to 12 carbon atoms, preferably 2 to 6 carbon atoms; a substituted or unsubstituted 9,9-fluorenylidene group; a substituted or unsubstituted arylene group having 6 to 12 carbon atoms, preferably 6 to 10 carbon atoms; a divalent functional group derived from terpenes represented by a formula (4A) below.

[Chemical Formula 16]

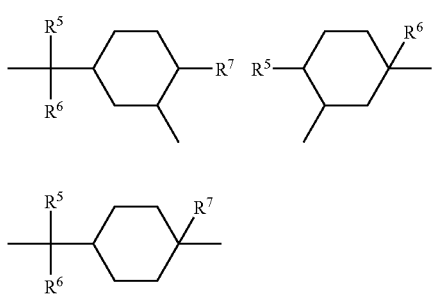

(4A)

In the above formula, R$^5$ to R$^7$ each represent the same functional group as R$^1$ and R$^2$; and an alkylidene-arylene-alkylidene group having 8 to 16 carbon atoms, preferably 12 to 16 carbon atoms represented by a formula (5A) below.

[Chemical Formula 17]

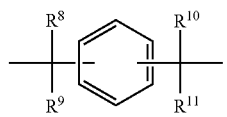

(5A)

In the above formula, R$^8$ to R$^{11}$ each represent the same functional group as R$^1$ and R$^2$.

Among X in the above formula (3A), a substituted or unsubstituted alkyl group having 1 to 10 carbon atoms and a substituted or unsubstituted aryl group having 6 to 12 carbon atoms for R$^3$ and R$^4$ in —CR$^3$R$^4$— are the same as those for R$^1$ and R$^2$ in the formula (3A). R$^3$ and R$^4$ are identical with or different from each other. Specifically, R$^3$ and R$^4$ are exemplified by a combination of hydrogen and a methyl group, a combination of a methyl group and a methyl group, a combination of a methyl group and an ethyl group and a combination of a methyl group and a phenyl group.

Examples of the substituted or unsubstituted cycloalkylidene group having 5 to 11 carbon atoms in X are a cyclopentylidene group, a cyclohexylidene group and a cycloheptylidene group. Examples of the substituted or unsubstituted α,ω-alkylene group having 2 to 12 carbon atoms are α,ω-ethylene group, α,ω-propylene group and α,ω-butylene group. Examples of the substituted or unsubstituted arylene group having 6 to 12 carbon atoms are a phenylene group, an alkyl-substituted phenylene group, a naphthylene group and an alkyl-substituted naphthylene group.

Examples of such a combination of the functional group represented by the above formula (3A) to form the monomer unit represented by the formula (2) include: (A) a combination of a functional group in which X is a single bond and a functional group in which X is not a single bond, (B) a combination of a functional group in which X is a substituted or unsubstituted cycloalkylidene group having 5 to 11 carbon atoms and a functional group in which X is other than a substituted or unsubstituted cycloalkylidene group having 5 to 11 carbon atoms, (C) a combination of a functional group in which X is a substituted or unsubstituted 9,9-fluorenylidene group and a functional group in which X is other than a substituted or unsubstituted 9,9-fluorenylidene group or (D) a combination of a functional group in which X is an alkylidene-arylene-alkylidene group having 8 to 16 carbon atoms and a functional group in which X is other than an alkylidene-arylene-alkylidene group having 8 to 16 carbon atoms.

In the monomer unit represented by the formula (1A) to form the copolymerized PC according to this exemplary embodiment, a siloxane chain length (n2) represented by the repeating number of the dimethylsiloxane unit is in a range of 25 to 700, preferably 35 to 300, more preferably 45 to 220, further preferably 55 to 160.

When the siloxane chain length is less than 25, scratch resistance is deteriorated, which is unfavorable as an electrophotographic photoreceptor. On the other hand, when the siloxane chain length is more than 700, white turbidity easily occurs when dissolved in a solvent such as THF. A molding product obtained by coating such a solution as a coating liquid is poor in transparency and electrical characteristics (photoconductor characteristics and the like), which is unfavorable as an electrophotographic photoreceptor.

In copolymerized PC according to this exemplary embodiment, a content of the monomer unit represented by the formula (1A) (polysiloxane unit) is not particularly limited.

However, a rate of the monomer unit in total content of a polycarbonate copolymer is preferably in a range of 0.01 to 50 mass %, more preferably in a range of 0.05 to 20 mass %, further preferably in a range of 0.1 to 10 mass %, the most preferably in a range of 0.5 to 5 mass % in consideration of, for example, a binder resin characteristics for an electrophotographic photoreceptor and electrical characteristics (photoconductor characteristics) and scratch resistance of a final electrophotographic photoreceptor.

When a mass fraction of the monomer unit is less than 0.01 mass %, the obtained electrophotographic photoreceptor unfavorably exhibits insufficient scratch resistance. When the mass fraction of the monomer unit is more than 50 mass %, the strength of the electrophotographic photoreceptor is lowered, so that scratch resistance is unfavorably lowered.

The siloxane chain length and the mass fraction of the monomer unit of the formula (1A) are both preferably in the same range as mentioned above.

In a solution where the copolymerized PC according to this exemplary embodiment is dissolved in a solvent of methylene chloride at a concentration of 0.5 g/dl, the copolymerized PC preferably exhibits reduced viscosity [$\eta_{sp}$/C] at 20 degrees C. in a range of 0.1 to 5 dl/g, more preferably 0.2 to 3 dl/g and particularly preferably 0.3 to 2.5 dl/g. When the reduced viscosity [$\eta_{sp}$/C] is less than 0.1 dl/g, scratch resistance of the electrophotographic photoreceptor may be insufficient. On the other hand, when the reduced viscosity [$\eta_{sp}$/C] is more than 5 dl/g, solution viscosity of the copolymerized PC may be too increased in manufacturing the photoreceptors, whereby productivity of the electrophotographic photoreceptor may be unfavorably lowered.

The copolymerized PC is preferably a ternary copolymer formed of the specified polysiloxane unit, biphenol unit and bisphenol unit, because the solubility in the coating liquid for forming the electrophotographic photoreceptor is increased and scratch resistance of the electrophotographic photoreceptor is further increased.

For instance, the monomer unit represented by the formula (2) is preferably a combination of a so-called biphenol unit in which X in the formula (3A) is a single bond and a bisphenol unit in which X is —$CR^3R^4$— or a cycloalkylidene having 5 to 11 carbon atoms.

The biphenol unit is also included in the bisphenol unit in a broad meaning. However, the biphenol unit of the present invention specifically refers to the unit in which X is a single bond. Respective monomers corresponding to these may be occasionally described as a biphenol compound and a bisphenol compound to distinguish each other.

As long as an object of the invention is not hampered, the copolymerized PC according to this exemplary embodiment may contain a monomer unit (repeating unit) other than the monomer unit represented by the formula (1A) and the monomer unit represented by the formula (2).

[Manufacturing Method of Copolymerized PC]

The copolymerized PC according to this exemplary embodiment can be easily manufactured, for instance, by reacting a carbonate-ester-forming compound with a mixed monomer of a polysiloxane monomer represented by a formula (6A) below and a monomer represented by a formula (7) below.

[Chemical Formula 18]

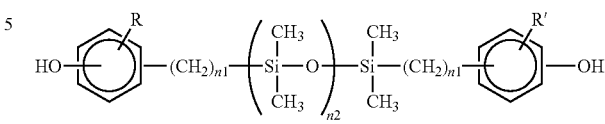

In the formula, R and R' each independently represent a hydrogen atom, a halogen atom, an alkyl group having 1 to 12 carbon atoms or a substituted or unsubstituted aryl group having 6 to 12 carbon atoms; n1 is an integer in a range of 2 to 4; and n2 is an integer in a range of 25 to 700.

[Chemical Formula 19]

$$HO—Ar—OH \quad (7)$$

In the formula, Ar represents a divalent aromatic group.

Examples of the monomer represented by the formula (6A) are polysiloxane compounds such as α,ω-bis[3-(2-hydroxyphenyl)propyl]dimethylsilylpolydimethylsiloxane, 2-[2-hydroxyphenyl]ethyl(polydimethylsiloxy)dimethylsilyl-ethyl-2-hydroxybenzene, 3-[4-hydroxyphenyl]propyl (polydimethylsiloxy)dimethylsilylpropyl-4-hydroxybenzene and 4-[4-hydroxyphenyl]butyl (polydimethylsiloxy)dimethylsilylbutyl-4-hydroxybenzene.

Examples of the monomer (divalent phenol) represented by the formula (7) are a biphenol compound and a bisphenol compound. Examples of the biphenol compound are 4,4'-biphenol, 3,3'-dimethyl-4,4'-biphenol, 3,3',5-trimethyl-4,4'-biphenol, 3-propyl-4,4'-biphenol, 3,3',5,5'-tetramethyl-4,4'-biphenol, 3,3'-diphenyl-4,4'-biphonol and 3,3'-dibutyl-4,4'-biphenol. Among the above, 4,4'-biphenol is preferable in that less colored copolymerized PC is provided. In addition, when 4,4-biphenol is applied to a copolymerized PC for electrophotographic photoreceptors, durability thereof is enhanced. One of the above may be singularly used, or two or more of the above may be used together.

Examples of bisphenols are 1,1-bis(3-methyl-4-hydroxyphenyl) ethane, 9,9-bis(3-phenyl-4-hydroxyphenyl) fluorene, bis(4-hydroxyphenyl) methane, 1,1-bis(4-hydroxyphenyl) ethane, 1,2-bis(4-hydroxyphenyl) ethane, 2,2-bis(4-hydroxyphenyl) propane, 2,2-bis(3-methyl-4-hydroxyphenyl) butane, 2,2-bis(4-hydroxyphenyl) butane, 2,2-bis(4-hydroxyphenyl) octane, 4,4-bis(4-hydroxyphenyl) heptane, 1,1-bis(4-hydroxyphenyl)-1,1-diphenyl methane, 1,1-bis(4-hydroxyphenyl)-1-phenyl ethane, 1,1-bis(4-hydroxyphenyl)-1-phenyl methane, bis(4-hydroxyphenyl) ether, bis(4-hydroxyphenyl) sulfide, bis(4-hydroxyphenyl) sulfone, 1,1-bis(4-hydroxyphenyl)cyclopentane, 1,1-bis(3-methyl-4-hydroxyphenyl)cyclopentane, 1,1-bis(4-hydroxyphenyl)cyclohexane, 2,2-bis(3-methyl-4-hydroxyphenyl) propane, 2,2-bis(3-phenyl-4-hydroxyphenyl) propane, 2,2-bis(4-hydroxyphenyl) adamantane, 2,2-bis(3-methyl-4-hydroxyphenyl) adamantane, 1,3-bis(4-hydroxyphenyl) adamantane, 1,3-bis(3-methyl-4-hydroxyphenyl) adamantane, 2-(3-methyl-4-hydroxyphenyl)-2-(4-hydroxyphenyl)-1-phenyl ethane, bis(3-methyl-4-hydroxyphenyl) sulfide, bis(3-methyl-4-hydroxyphenyl) sulfone, bis(3-methyl-4-hydroxyphenyl) methane, 1,1-bis(3-methyl-4-hydroxyphenyl) cyclohexane, 2,7-naphthalenediol, 2,6-naphthalenediol, 1,4-naphthalenediol, 1,5-naphthalenediol, 2,2-bis(2-methyl-4-hydroxyphenyl) propane, 1,1-bis(2-butyl-4-hydroxy-5-methylphenyl) butane, 1,1-bis(2-tert-butyl-4-hydroxy-3-methylphenyl) ethane, 1,1-bis(2-tert-butyl-4-hydroxy-5- methylphenyl) propane, 1,1-bis(2-tert-butyl-4-hydroxy-5-methylphenyl) butane, 1,1-bis(2-tert-butyl-4-hydroxy-5-methylphenyl) isobutane, 1,1-bis(2-tert-butyl-4-hydroxy-5-methylphenyl) heptane, 1,1-bis(2-tert-butyl-4-hydroxy-5-methylphenyl)-1-phenyl methane, 1,1-bis(2-tert-amyl-4-hydroxy-5-methylphenyl) butane, bis(3-chloro-4-hydroxyphenyl) methane, bis(3,5-dibromo-4-hydroxyphenyl) methane, 2,2-bis(3-chloro-4-hydroxyphenyl) propane, 2,2-bis(3-fluoro-4-hydroxyphenyl) propane, 2,2-bis(3-bromo-4-hydroxyphenyl) propane, 2,2-bis(3,5-difluoro-4-hydroxyphenyl) propane, 2,2-bis(3,5-dichloro-4-hydroxyphenyl) propane, 2,2-bis(3,5-dibromo-4-hydroxyphenyl) propane, 2,2-bis(3-bromo-4-hydroxy-5-chlorophenyl) propane, 2,2-bis(3,5-dichloro-4-hydroxyphenyl) butane, 2,2-bis(3,5-dibromo-4-hydroxyphenyl) butane, 1-phenyl-1,1-bis(3-fluoro-4-hydroxyphenyl) ethane, bis(3-fluoro-4-hydroxyphenyl) ether, 3,3'-difluoro-4,4'-dihydroxy biphenyl, 1,1-bis(3-cyclohexyl-4-hydroxyphenyl)cyclohexane, 2,2-bis(4-hydroxyphenyl) hexafluoro propane, 1,1-bis(3-phenyl-4-hydroxyphenyl)cyclohexane, bis(3-phenyl-4-hydroxyphenyl) sulfone, 4,4'-(3,3,5-trimethylcyclohexylidene)diphenol, 4,4'-[1,4-phenylene bis(1-methylethylidene)]bisphenol, 4,4'-[1,3-phenylene bis(1-methylethylidene)]bisphenol, 9,9-bis(4-hydroxyphenyl) fluorene, 9,9-bis(4-hydroxy-3-methylphenyl) fluorene, terminal phenol polydimethylsiloxane, α-trimethylsiloxy-ω-bis{3-(2-hydroxyphenyl) propyldimethylsiloxy}-methylsiloxy-2-dimethylsilylethyl-polydimethylsiloxane and α,ω-bis(3-(4-hydroxy-3-methoxyphenyl)propyl)-dimethylsiloxy-polydimethylsiloxane.

One of the above bisphenol compounds may be singularly used, or two or more of them may be mixed for use. In addition, by using trivalent or multivalent phenol, a branched structure may be included therein.

Among the above bisphenol compounds, 1,1-bis(4-hydroxyphenyl) ethane, 2,2-bis(4-hydroxyphenyl) butane, 2,2-bis(4-hydroxyphenyl) propane, 1,1-bis(4-hydroxyphenyl)-1,1-diphenyl methane, 1,1-bis(4-hydroxyphenyl)1-phenyl ethane, bis(4-hydroxyphenyl) sulfone, 1,1-bis(4-hydroxyphenyl)cyclohexane, 2,2-bis(3-methyl-4-hydroxyphenyl) propane, 1,1-bis(3-methyl-4-hydroxyphenyl)cyclohexane, 1,1-bis(3-methyl-4-hydroxyphenyl)cyclopentane, 2,2-bis(3-phenyl-4-hydroxyphenyl) propane, 4,4-(3,3,5-trimethylcyclohexylidene)diphenol, 4,4-[1,4-phenylene bis(1-methylethylidene)]bisphenol, 4,4-[1,3-phenylene bis(1-methylethylidene)]bisphenol, 9,9-bis(4-hydroxyphenyl) fluorene, 9,9-bis(4-hydroxy-3-methylphenyl) fluorene, terminal phenol polydimethylsiloxane, α-trimethylsiloxy-ω-bis{3-(2-hydroxyphenyl)propyldimethylsiloxy}-methylsiloxy-2-dimethylsilylethyl-polydimethylsiloxane, and α,ω-bis(3-(4-hydroxy-3-methoxyphenyl)propyl)-dimethylsiloxy-polydimethylsiloxane are preferable.

Further preferable examples are 1,1-bis(4-hydroxyphenyl) ethane, 2,2-bis(4-hydroxyphenyl) butane, 2,2-bis(4-hydroxyphenyl) propane, 1,1-bis(4-hydroxyphenyl)1-phenyl ethane, 1,1-bis(4-hydroxyphenyl)cyclohexane, 2,2-bis(3-methyl-4-hydroxyphenyl) propane, 1,1-bis(3-methyl-4-hydroxyphenyl)cyclohexane, 1,1-bis(3-methyl-4-hydroxyphenyl)cyclopentane, 2,2-bis(3-phenyl-4-hydroxyphenyl) propane, 4,4-(3,3,5-trimethylcyclohexylidene)diphenol, and 9,9-bis(4-hydroxy-3-methylphenyl) fluorene.

When the copolymerized PC manufactured with use of such bisphenols as the monomer is applied to an electrophotographic photoreceptor, the electrophotographic photoreceptor becomes invulnerable to friction with other components in a cleaning process and the like, so that the durability (scratch resistance) thereof is favorably enhanced.

The copolymerized PC according to this exemplary embodiment can be easily obtained by conducting interfacial polycondensation with use of the monomer represented by the formula (6A) and the monomer represented by the formula (7). For instance, by conducting interfacial polycondensation under the presence of an acid-binding agent with use of various carbonyl dihalides such as phosgene, halo formates such as chloroformate compounds or a carbonate ester compound, carbonate ester bonding can be favorably formed. The above reaction(s) is conducted under the presence of a terminal terminator and/or a branching agent as needed. Alternatively, in manufacturing the copolymerized PC according to this exemplary embodiment, the monomer (divalent phenol) represented by the formula (7) may be a ternary copolymer in a combination with the biphenol compound and the bisphenols.

As the terminal terminator, monovalent carboxylic acid and derivatives thereof, and monovalent phenol are usable. For instance, p-tert-butyl-phenol, p-phenylphenol, p-cumylphenol, p-perfluoro nonylphenol, p-(perfluoro nonyl phenyl) phenol, p-(perfluoroxyl phenyl) phenol, p-tert-perfluorobutyl phenol, 1-(P-hydroxybenzyl) perfluorodecane, p-[2-(1H,1H-perfluorotridodecyloxy)-1,1,1,3,3,3-hexafluoro propyl]phenol, 3,5-bis(perfluoro hexyloxy carbonyl) phenol, p-hydroxy perfluoro dodecyl benzoate, p-(1H,1H-perfluoro octyloxy) phenol, 2H,2H,9H-perfluoro nonane acid, 1,1,1,3,3,3-hexaphloro-2-propanol, or alcohols represented by the following formulae are preferably used.

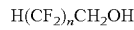

(n represents an integer of 1 to 12.)

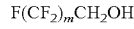

(m represents an integer of 1 to 12.)

A ratio at which the terminal terminator is added is 0.05 to 30 mol % per the copolymer composition, more preferably 0.1 to 10 mol %. When the ratio is more than 30 mol %, mechanical strength may be deteriorated. When the content is less than 0.05 mol %, moldability may be deteriorated.

Examples of the branching agent are phloroglucin, pyrogallol, 4,6-dimethyl-2,4,6-tris(4-hydroxyphenyl)-2-heptene, 2,6-dimethyl-2,4,6-tris(4-hydroxyphenyl)-3-heptene, 2,4-dimethyl-2,4,6-tris(4-hydroxyphenyl) heptane, 1,3,5-tris(2-hydroxyphenyl) benzene, 1,3,5-tris(4-hydroxyphenyl) benzene, 1,1,1-tris(4-hydroxyphenyl) ethane, tris(4-hydroxyphenyl) phenylmethane, 2,2-bis[4,4-bis(4-hydroxyphenyl)cyclohexyl]propane, 2,4-bis[2-bis(4-hydroxyphenyl)-2-propyl]phenol, 2,6-bis(2-hydroxy-5-methylbenzyl)-4-methylphenol, 2-(4-hydroxyphenyl)-2-(2,4-dihydroxyphenyl) propane, tetrakis(4-hydroxyphenyl) methane, tetrakis[4-(4-hydroxyphenyl isopropyl)phenoxy] methane, 2,4-dihydroxybenzoic acid, trimesic acid, cyanuric acid, 3,3-bis(3-methyl-4-hydroxyphenyl)-2-oxo-2,3-dihydroindole, 3,3-bis(4-hydroxyaryl)oxyindole, 5-chloroisatin, 5,7-dichloroisatin and 5-bromoisatin.

An additive amount of the branching agent is preferably 30 mol % or less per the copolymer composition, more preferably 5 mol % or less. When the additive amount is more than 30 mol %, moldability may be deteriorated.

Examples of the acid-binding agent usable in interfacial polycondensation are alkaline metal hydroxide such as sodium hydroxide, potassium hydroxide, lithium hydroxide and cesium hydroxide, alkaline earth metal hydroxide such as magnesium hydroxide and calcium hydroxide, alkali metal carbonate such as sodium carbonate and potassium carbonate, organic base such as pyridine or mixture(s) of the above. Use ratio of the acid-binding agent may be also suitably adjusted in consideration of stoichiometric proportion (equivalent amount) in the reaction. Specifically, per 1 mol of a hydroxyl group of the divalent phenol (material), 1 equivalent or more, preferably 1 to 10 equivalent of the acid-binding agent may be used.

Preferable examples of a solvent usable therein are aromatic hydrocarbon such as toluene and xylene, halogenated hydrocarbon such as methylene chloride, chloroform, 1.1-dichloroethane, 1,2-dichloroethane, 1,1,1-trichloroethane, 1,1,2-trichloroethane, 1,1,1,2-tetrachloroethane, 1,1,2,2,-tetrachloroethane, pentachloroethane and chlorobenzene, and acetophenone. One of the above solvents may be singularly used, or two or more of the above may be used together. With use of two solvents that are not miscible with each other, interfacial polycondensation may be conducted.

Preferable examples of a catalyst are tertiary amine such as trimethyl amine, triethyl amine, tributyl amine, N,N-dimethylcyclohexyl amine, pyridine and dimethyl aniline, quaternary ammonium salt such as trimethyl benzyl ammonium chloride, triethyl benzyl ammonium chloride, tributyl benzyl ammonium chloride, trioctyl methyl ammonium chloride, tetrabutyl ammonium chloride and tetrabutyl ammonium bromide, and quaternary phosphonium salt such as tetrabutyl phosphonium chloride and tetrabutyl phosphonium bromide.

Further, if necessary, a small amount of an antioxidant such as sodium sulfite and hydrosulfite salt may be added to the reaction system.

For manufacturing of the copolymerized PC, various methods are specifically usable. According to a usable exemplary method, polycarbonate oligomer is manufactured by reacting the bisphenol compound and/or the biphenol compound represented by the formula (7) with phosgene, and then the polycarbonate oligomer is reacted with the polysiloxane monomer represented by the formula (6A) under the presence of a mixture of the above solvent and an alkali aqueous solution of the above acid-binding agent. Alternatively, the above divalent phenol and phosgene may be reacted with each other in the mixture of the solvent and the alkali aqueous solution. Usually, the former method (i.e., the method in which polycarbonate oligomer is manufactured in advance) is preferable in terms of efficiency.

In order to manufacture polycarbonate oligomer, the divalent phenol is initially dissolved in an alkali aqueous solution to prepare an alkali aqueous solution of the divalent phenol. Subsequently, phosgene is introduced into a mixture of the prepared alkali aqueous solution and an organic solvent such as methylene chloride for a reaction therein, and polycarbonate oligomer of the divalent phenol is synthesized. Then, the reaction solution is subjected to a separation into aqueous phase and organic phase, so that organic phase containing polycarbonate oligomer is obtained. At this time, alkali concentration of the alkali aqueous solution is preferably in a range of 0.1 to 5N. A volume ratio of the organic phase to the aqueous phase is in a range of 10:1 to 1:10, preferably in a range of 5:1 to 1:5.

A reaction temperature is typically in a range of 0 to 70 degrees C. under cooling, more preferably in a range of 5 to 65 degrees C. Reaction time is in a range of 15 minutes to 4 hours, preferably 30 minutes to 3 hours. The average molecular weight of the obtained polycarbonate oligomer is 6000 or less. The polymerization degree of the polycarbonate oligomer is typically 20 or less. The polycarbonate oligomer is preferably any one of dimer to decamer.

The organic phase containing the obtained polycarbonate oligomer is added with the polysiloxane monomer of the formula (6A) for reaction. The reaction temperature is 0 to 150 degrees C., preferably 5 to 40 degrees C., particularly preferably 5 to 25 degrees C. Particularly by conducting the reaction at the reaction temperature of 25 degrees C. or less, yellowness of the obtained copolymerized PC can be preferably reduced.

A reaction pressure may be any one of a reduced pressure, a normal pressure and an added pressure. Typically, the reaction can be favorably performed under a pressure that is approximately equal to the normal pressure or a self-pressure of the reaction system. The reaction time, which is dependant on the reaction temperature, is typically in a range of 0.5 minute to 10 hours, preferably 1 minute to 2 hours.

In accordance with increase in the number of the repeating unit of polydimethylsiloxane, the obtained copolymerized PC is easily whitened (increased in haze) in the THF solution under the same polymerization conditions. In order to avoid white turbidity, it is required to decrease a solid content concentration (a content of polymerizable component in a solvent) at polymerization in accordance with increase in the repeating unit number of polydimethylsiloxane. For instance, the solid content concentration of polycarbonate oligomer is preferably in a range below in accordance with the siloxane chain length (repeating unit number). Although methylene chloride is suitable for the solvent, but other solvents exhibit a similar tendency.

Chain Length 25 to 45: 210 g/L or less
Chain Length 46 to 55: 150 g/L or less
Chain Length 56 to 92: 120 g/L or less
Chain Length 93 to 137: 100 g/L or less
Chain Length 138 to 158: 60 g/L or less
Chain Length 159 to 350: 30 g/L or less At the time of the reaction, the divalent phenol is preferably added in a form of an organic-solvent solution and/or an alkali aqueous solution. The order of the addition is not specifically limited. In the above manufacturing method, the catalyst, the terminal terminator, the branching agent and the like may be added as needed at the time of manufacturing polycarbonate oligomer or at the time of subsequent polymerization reaction, or both at the time of manufacturing polycarbonate oligomer and at the time of subsequent polymerization reaction.

The copolymerized PC thus obtained is a copolymer formed of the repeating unit(s) represented by the formula (1A) and the repeating unit(s) represented by the formula (2).

As long as an object of the invention is not hampered, the copolymerized PC may contain a polycarbonate unit having a structure unit other than those of the formulae (1A) and (2), or a unit having a polyester structure, a polyurethane structure or a polyether structure.

For controlling the reduced viscosity [$\eta_{sp}/C$] (a value correlated to the viscosity-average molecular weight) of the obtained copolymerized PC to be within the above-described range, various methods (such as a method of selecting the reaction conditions and a method of adjusting the use amount of the branching agent and a molecular weight adjuster) are available. In addition, if necessary, the obtained copolymerized PC may be subjected to a physical treatment (e.g., mixing and cutoff) and/or a chemical treatment (e.g., polymer reaction, cross linking or partial degradation), so that the copolymerized PC having a predetermined reduced viscosity [$\eta_{sp}/C$] may be obtained.

The obtained reaction product (crude product) may be subjected to various aftertreatments such as known separation and refinement, so that the copolymerized PC having desirable purity (desirable refining degree) may be obtained.

[Coating Liquid]

A coating liquid according to another aspect of the invention contains the above-described polycarbonate copolymer and the solvent. In order to use the coating liquid for forming a photosensitive layer of an electrophotographic photoreceptor described below, a concentration of the coating liquid is preferably in a range of 0.1 to 40 mass %, more preferably in a range of 1 to 35 mass %, further preferably in a range of 5 to 30 mass %. Examples of a solvent are the same as those described in the manufacturing method of the copolymerized PC above. Further, the solvent may be a cyclic ether such as tetrahydrofuran, dioxane, dioxolan and the like. Such a coating liquid formed of the polycarbonate polymer and the solvent exhibits excellent stability for a long term without causing white turbidity or gelation. In other words, application of the coating liquid for forming the photosensitive layer of the electrophotographic photoreceptor can provide the electrophotographic photoreceptor that exhibits excellent electrophotography property and scratch resistance for a long term without causing crystallization of a binder resin in coating.

[Arrangement of Electrophotographic Photoreceptor]

As long as the above-described copolymerized PC is used in the photosensitive layer, the electrophotographic photoreceptor according to this exemplary embodiment may be any electrophotographic photoreceptor (e.g. one of known various electrophotographic photoreceptors). However, the photosensitive layer is preferably an organic electrophotographic photoreceptor that includes at least one charge generating layer and at least one charge transporting layer, or alternatively includes a single layer containing both a charge generating material and a charge transport material.

While the copolymerized PC may be used in any portion of the photosensitive layer, in order for the invention to sufficiently provide an advantage, the copolymerized PC is preferably used as the binder resin of the charge transport material, as the binder resin of the single photosensitive layer or as a surface protecting layer. When the electrophotographic photoreceptor has double charge transporting layers (i.e., multilayer electrophotographic photoreceptor), the copolymerized PC is preferably used in either one of the charge transporting layers.

In the electrophotographic photoreceptor according to this exemplary embodiment, one type of the copolymerized PC according to this exemplary embodiment may be singularly used, or two or more types thereof may be used together. Further, as long as an object of the invention is not hampered, a binder-resin component such as another polycarbonate may be contained as desired. In addition, an additive such as an antioxidant may be contained.

The electrophotographic photoreceptor according to this exemplary embodiment has its photosensitive layer on a conductive substrate. When the photosensitive layer has the charge generating layer and the charge transporting layer, the charge transporting layer may be laminated on the charge generating layer, or the charge generating layer may be laminated on the charge transporting layer. Further alternatively, the single layer of the electrophotographic photoreceptor may contain both the charge generating material and the charge transport material. When necessary, a surface layer of the electrophotographic photoreceptor may be provided with a conductive or insulating protective film. The electrophotographic photoreceptor may be further provided with an intermediate layer(s) such as adhesive layer for enhancing adhesion between layers and blocking layer for blocking charges.

Various conductive substrate materials (e.g., known materials) are usable for forming the electrophotographic photoreceptor according to this exemplary embodiment. Examples of such conductive substrate materials are: a plate, a drum and a sheet made of material such as aluminum, nickel, chrome, palladium, titanium, molybdenum, indium, gold, platinum, silver, copper, zinc, brass, stainless steel, lead oxide, tin oxide, indium oxide, ITO (indium tin oxide; tin-doped indium oxide) and graphite; glass, cloth, paper, plastic film, plastic sheet and seamless belt having been treated with conductive treatment through coating by vapor deposition, sputtering or application; and a metal drum having been treated with metal oxidation treatment by electrode oxidation and the like.

The charge generating layer contains at least the charge generating material. The charge generating layer can be obtained by forming a layer of the charge generating material on the underlying substrate by vacuum deposition, sputtering or the like, or by forming a layer in which the charge generating material is bound onto the underlying substrate with use of a binder resin. While various methods (e.g., known methods) are usable for forming the charge generating layer with use of a binder resin, the charge generating layer is preferably obtained as a wet molding typically formed by applying, for instance, a coating agent in which both the charge generating material and the binder resin are dispersed or dissolved in a suitable solvent onto a predetermined underlying substrate and drying the applied coating agent.

Various known materials are usable as the charge generating material in the charge generating layer. Examples of such materials are: elementary selenium such as amorphous selenium and trigonal selenium; selenium alloy such as selenium-tellurium; selenium compound or selenium-containing composition such as $As_2Se_3$; inorganic material formed of 12 group element and 16 group element in the periodic system such as zinc oxide and CdS—Se; oxide-base semiconductor such as titanium oxide; silicon-base material such as amorphous silicon; metal-free phthalocyanine pigment such as τ-type metal-free phthalocyanine and χ-type metal-free phthalocyanine; metal phthalocyanine pigment such as α-type copper phthalocyanine, β-type copper phthalocyanine, γ-type copper phthalocyanine, ε-type copper phthalocyanine, X-type copper phthalocyanine, A-type titanyl phthalocyanine, B-type titanyl phthalocyanine, C-type titanyl phthalocyanine, D-type titanyl phthalocyanine, E-type titanyl phthalocyanine, F-type titanyl phthalocyanine, G-type titanyl phthalocyanine, H-type titanyl phthalocyanine, K-type titanyl phthalocyanine, L-type titanyl phthalocyanine, M-type titanyl phthalocyanine, N-type titanyl phthalocyanine, Y-type titanyl phthalocyanine, oxotitanyl phthalocyanine, titanyl phthalocyanine whose black angle 2θ has its diffraction peak at 27.3±0.2 degrees in a X-ray diffraction diagram, and gallium phthalocyanine; cyanine dye; anthracene pigment; bisazo pigment; pyrene pigment; polycyclic quinone pigment; quinacridone pigment; indigo pigment; perylene pigment; pyrylium dye; squarium pigment; anthoanthrone pigment; benzimidazole pigment; azo pigment; thioindigo pigment; quinoline pigment; lake pigment; oxazine pigment; dioxazine pigment; triphenylmethane pigment; azulenium dye; triarylmethane dye; xanthine dye; thiazine dye; thiapyrylium dye; polyvinyl carbazole; and bisbenzimidazole pigment. One of the above compounds may be singularly used, or two or more of them may be mixed for use as the charge generating material. Among the above charge generating materials, a compound disclosed in JP-A-11-172003 is preferable.

The charge transporting layer can be obtained as a wet molding by forming a layer in which the charge transport material is bound onto the underlying substrate by a binder resin.

The binder resin for the charge generating layer and the charge transporting layer is not specifically limited. Various known resins are usable. Examples of such resins are polystyrene, polyvinyl chloride, polyvinyl acetate, vinyl chloride-vinyl acetate copolymer, polyvinyl acetal, alkyd resin, acrylic resin, polyacrylonitrile, polycarbonate, polyurethane, epoxy resin, phenol resin, polyamide, polyketone, polyacrylamide, butyral resin, polyester resin, vinylidene chloride-vinyl chloride copolymer, methacrylic resin, styrene-butadiene copolymer, vinylidene chloride-acrylonitrile copolymer, vinyl chloride-vinyl acetate-maleic anhydride copolymer, silicone resin, silicone-alkyd resin, phenol-formaldehyde resin, styrene-alkyd resin, melamine resin, polyether resin, benzoguanamine resin, epoxy-acrylate resin, urethane acrylate resin, poly-N-vinylcarbazole, polyvinyl butyral, polyvinyl formal, polysulphone, casein, gelatine, polyvinyl alcohol, ethyl cellulose, cellulose nitrate, carboxymethyl cellulose, vinylidene chloride-base polymer latex, acrylonitrile-butadiene copolymer, vinyl toluene-styrene copolymer, soybean oil-modified alkyd resin, nitrated polystyrene, polymethylstyrene, polyisoprene, polythiocarbonate, polyarylate, polyhaloarylate, polyallyl ether, polyvinyl acrylate and polyester acrylate.

One of the above resins may be singularly used, or two or more of them may be mixed for use. The binder resin used in the charge generating layer and the charge transporting layer is preferably the copolymerized PC according to this exemplary embodiment.

While various known methods are usable for forming the charge transporting layer, the charge transporting layer is preferably obtained as a wet molding formed by applying a coating liquid in which both the charge transport material and the copolymerized PC according to this exemplary embodiment are dispersed or dissolved in a suitable solvent onto a predetermined underlying substrate and drying the applied coating liquid. For forming the charge transporting layer, the charge transport material and the copolymerized PC are mixed together preferably by a mass ratio of 20:80 to 80:20, more preferably 30:70 to 70:30.

In the charge transporting layer, one type of the copolymerized PC according to this exemplary embodiment may be singularly used, or two or more types thereof may be used together. As long as an object of the invention is not hampered, the charge transporting layer may also contain another binder resin in addition to the copolymerized PC according to this exemplary embodiment.

The thickness of the charge transporting layer is typically approximately 5 to 100 µm, preferably 10 to 30 µm. When the thickness is less than 5 µm, the initial potential may be lowered. When the thickness is more than 100 µm, electrophotographic characteristics may be deteriorated.

Various known compounds are usable as the charge transport material that is usable together with the copolymerized PC according to this exemplary embodiment. Preferable examples of such compounds are carbazole compound, indole compound, imidazole compound, oxazole compound, pyrazole compound, oxadiazole compound, pyrazoline compound, thiadiazole compound, aniline compound, hydrazone compound, aromatic amine compound, aliphatic amine compound, stilbene compound, fluorenone compound, butadiene compound, quinone compound, quinodimethane compound, thiazole compound, triazole compound, imidazolone compound, imidazolidine compound, bisimidazolidine compound, oxazolone compound, benzothiazole compound, benzimidazole compound, quinazoline compound, benzofuran compound, acridine compound, phenazine compound, poly-N-vinylcarbazole, polyvinyl pyrene, polyvinyl anthracene, polyvinyl acridine, poly-9-vinyl phenyl anthracene, pyrene-formaldehyde resin, ethylcarbazole resin, and a polymer having the above structure in the main chain or side chain. One of the above compounds may be singularly used, or two or more of the above may be used together.

Among the above charge transport materials, a compound disclosed in JP-A-11-172003 is particularly preferably usable.

In the electrophotographic photoreceptor according to this exemplary embodiment, the copolymerized PC according to this exemplary embodiment is preferably used as the binder resin in at least either one of the charge generating layer and the charge transporting layer.

The electrophotographic photoreceptor according to this exemplary embodiment may be provided with a typically-used undercoat layer between the conductive substrate and the photosensitive layer. Examples of the undercoat layer are particles such as titanium oxide, aluminum oxide, zirconia, titanic acid, zirconic acid, lanthanum lead, titanium black, silica, lead titanate, barium titanate, tin oxide, indium oxide and silicon oxide, and components such as polyamide resin, phenol resin, casein, melamine resin, benzoguanamine resin, polyurethane resin, epoxy resin, cellulose, cellulose nitrate, polyvinyl alcohol and polyvinyl butyral resin. The resin usable for the undercoat layer may be the above binder resin or the copolymerized PC according to this exemplary embodiment. One of the above particles and the resins may be singularly used or a variety thereof may be mixed together in use. When a mixture thereof is used, a combination of inorganic particles and a resin is preferable because a flat and smooth film can be made.

The thickness of the undercoat layer is typically approximately 0.01 to 10 µm, preferably 0.1 to 7 µm. When the thickness is less than 0.01 µm, it is difficult to form an even undercoat layer. On the other hand, when the thickness is more than 10 µm, electrophotographic characteristics may be deteriorated. The electrophotographic photoreceptor according to this exemplary embodiment may be provided with a typically-used known blocking layer between the conductive substrate and the photosensitive layer. The blocking layer may be made of the same resin as the binder resin. Alternatively, the blocking layer may be made of the polycarbonate resin according to this exemplary embodiment. The thickness of the blocking layer is typically 0.01 to 20 µm, preferably 0.1 to 10 µm. When the thickness is less than 0.01 µm, it is difficult to form an even blocking layer. On the other hand, when the thickness is more than 20 µm, electrophotographic characteristics may be deteriorated.

The electrophotographic photoreceptor according to this exemplary embodiment may be further provided with a protective layer laminated on the photosensitive layer. The protective layer may be made of the same resin as the binder resin. Alternatively, the protective layer may be made of the polycarbonate resin according to this exemplary embodiment. The thickness of the protective layer is typically 0.01 to 20 µm, preferably 0.1 to 10 µm. The protective layer may contain a conductive material such as the charge generating material, the charge transport material, an additive, a metal, oxides thereof, nitrides thereof, salts thereof, alloy thereof, carbon black and an organic conductive compound.

In order to enhance performance of the electrophotographic photoreceptor, the charge generating layer and the charge transporting layer may be added with a binder, a plasticizer, a curing catalyst, a fluidity adder, a pinhole controller and a spectral-sensitivity sensitizer (sensitizer dye). In addition, in order to prevent increase in residual potential after repeated use, reduction in charged potential and deterioration of sensitivity, various chemical substances and additives such as antioxidant, surfactant, curl inhibitor and leveling agent may be added.

Examples of the binders are silicone resin, polyamide resin, polyurethane resin, polyester resin, epoxy resin, polyketone resin, polycarbonate resin, polystyrene resin, polymethacrylate resin, polyacrylamide resin, polybutadiene resin, polyisoprene resin, melamine resin, benzoguanamine resin, polychloroprene resin, polyacrylonitrile resin, ethyl cellulose resin, cellulose nitrate resin, urea resin, phenol resin, phenoxy resin, polyvinyl butyral resin, formal resin, vinyl acetate resin, vinyl acetate/vinyl chloride copolymer resin, and polyester carbonate resin. In addition, a heat and/or light-curable resin is also usable. The binder is not specifically limited to the above, as long as the binder is an electric-insulating resin from which a film is formable under normal conditions, and as long as an advantage of the invention is not hampered.

Examples of the plasticizer are biphenyl, chlorinated biphenyl, o-terphenyl, halogenated paraffin, dimethylnaphthalene, dimethyl phthalate, dibutyl phthalate, dioctyl phthalate, diethylene glycol phthalate, triphenyl phosphate, diisobutyl adipate, dimethyl sebacate, dibutyl sebacate, laurate butyl, methylphthalyl ethyl glycolate, dimethyl glycol phthalate, methylnaphthalene, benzophenone, polypropylene, polystyrene, and fluorohydrocarbon.

Examples of the curing catalyst are methanesulfonic acid, dodecylbenzenesulfonic acid and dinonylnaphthalene disulfonic acid. Examples of the fluidity adder are Modaflow™ and Acronal 4F™. Examples of the pinhole controller are benzoin and dimethyl phthalate. The above plasticizer, curing catalyst, fluidity adder and pinhole controller are preferably contained at a content of 5 mass % or less of the charge transport material.

When a sensitizer dye is used as a spectral-sensitivity sensitizer, suitable examples of the sensitizer dye are triphenylmethane-base dye such as methyl violet, crystal violet, night blue and Victria blue, acridine dye such as erythrosine, Rhodamine B, Rhodamine 3R, acridine orange and frapeosine, thiazine dye such as methylene blue and methylene green, oxazine dye such as capri blue and meldra blue, cyanine dye, merocyanine dye, styryl dye, pyrylium salt dye and thiopyrylium salt dye.

In order to enhance the sensitivity, reduce the residual potential and reduce fatigue due to repeated use, the photosensitive layer may be added with an electron-accepting material. Examples of the electron-accepting material are preferably compounds having high electron affinity such as succinic anhydride, maleic anhydride, dibromo maleic anhydride, phthalic anhydride, tetrachloro phthalic anhydride, tetrabromo phthalic anhydride, 3-nitro phthalic anhydride, 4-nitro phthalic anhydride, pyromellitic anhydride, mellitic anhydride, tetracyanoethylene, tetracyanoquinodimethane, o-dinitro benzene, m-dinitro benzene, 1,3,5-trinitro benzene, p-nitrobenzonitrile, picryl chloride, quinone chlorimide, chloranil, bromanil, benzoquinone, 2,3-dichloro benzoquinone, dichloro dicyano parabenzoquinone, naphthoquinone, diphenoquinone, tropoquinone, anthraquinone, 1-chloro anthraquinone, dinitro anthraquinone, 4-nitrobenzophenone, 4,4-dinitrobenzophenone, 4-nitrobenzal malonodinitrile, α-cyano-β-(p-cyanophenyl)ethyl acrylate, 9-anthracenyl methylmalonodinitrile, 1-cyano-(p-nitrophenyl)-2-(p-chlorophenyl)ethylene, 2,7-dinitro fluorenone, 2,4,7-trinitro fluorenone, 2,4,5,7-tetranitro fluorenone, 9-fluorenylidene-(dicyano methylene malononitrile), polynitro-9-fluorenylidene-(dicyano methylene malonodinitrile), picric acid, o-nitrobenzoic acid, p-nitrobenzoic acid, 3,5-dinitrobenzoic acid, pentafluorobenzoic acid, 5-nitrosalicylic acid, 3,5-dinitrosalicylic acid, phthalic acid and mellitic acid. The above compounds may be added to either the charge generating layer or the charge transporting layer. An additive ratio of the compounds is 0.01 to 200 parts by mass per 100 parts by mass of the charge generating material or the charge transport material, preferably 0.1 to 50 parts by mass.

Further, in order to improve surface quality, tetrafluoroethylene resin, trifluoroethylene chloride resin, tetrafluoroethylene hexafluoropropylene resin, vinyl fluoride resin, vinylidene fluoride resin, difluoroethylene dichloride resin, copolymer(s) thereof, or fluorine-base graft polymer may be used. An additive ratio of such surface modifiers is 0.1 to 60 mass % of the binder resin, preferably 5 to 40 mass %. When the additive ratio is less than 0.1 mass %, surface modification such as enhancement of surface durability and reduction in surface energy may not be sufficient. When the additive ratio is more than 60 mass %, the electrophotographic characteristics may be deteriorated.

Examples of the antioxidant are preferably a hindered phenol-base antioxidant, aromatic amine-base antioxidant, hindered amine-base antioxidant, sulfide-base antioxidant and organophosphate-base antioxidant. An additive ratio of such antioxidants is typically 0.01 to 10 mass % of the charge transport material, preferably 0.1 to 2 mass %.

Preferable examples of such antioxidants are compounds represented by chemical formulae disclosed in the Specification of JP-A-11-172003 ([Chemical Formula 94] to [Chemical Formula 101]).

One of the above antioxidants may be singularly used, or two or more of them may be mixed in use. In addition to the photosensitive layer, the above antioxidant may be added to the surface protecting layer, the undercoat layer and the blocking layer.

Examples of the solvent usable in forming the charge generating layer and the charge transporting layer are aromatic solvent such as benzene, toluene, xylene and chlorobenzene, ketone such as acetone, methyl ethyl ketone and cyclohexanone, alcohol such as methanol, ethanol and isopropanol, ester such as acetic ether and ethyl cellosolve, halogenated hydrocarbon such as carbon tetrachloride, carbon tetrabromide, chloroform, dichloromethane and tetrachloroethane, ether such as tetrahydrofuran, dioxolane and dioxane, dimethylformamide, dimethylsulfoxide, and diethyl formamide. One of the above solvents may be singularly used, or two or more of them may be used together as a mixture solvent.

The photosensitive layer of a single-layer electrophotographic photoreceptor can be easily formed by applying the binder resin (copolymerized PC) according to this exemplary embodiment with use of the charge generating material, the charge transport material and the additive. The charge transport material is preferably added with the above-described hole-transport material and/or an electron-transport material. Compounds disclosed in JP-A-2005-139339 can be preferably applied as the electron-transport material.

Various coating applicators (e.g., known applicators) can perform application of each layer. Examples of such a coating applicator are an applicator, a spray coater, a bar coater, a chip coater, a roll coater, a dip coater and a doctor blade.

The thickness of the photosensitive layer of the electrophotographic photoreceptor is 5 to 100 μm, preferably 8 to 50 μm. When the thickness is less than 5 μm, the initial potential tends to be low. When the thickness is more than 100 μm, electrophotographic characteristics may be deteriorated. In the electrophotographic photoreceptor, a ratio of the charge generating material to the binder resin is 1:99 to 30:70 by mass, more preferably 3:97 to 15:85 by mass. On the other hand, a ratio of the charge transport material to the binder resin is 10:90 to 80:20 by mass, more preferably 30:70 to 70:30 by mass.

Since the electrophotographic photoreceptor according to this exemplary embodiment uses the copolymerized PC according to this exemplary embodiment, a coating agent is not whitened (gelled) in manufacturing the photosensitive layer. In addition, since containing a molding (binder resin) molded of the copolymerized PC according to this exemplary embodiment in its photosensitive layer, the electrophotographic photoreceptor according to this exemplary embodiment has excellent durability (scratch resistance) and photoconductor characteristics. Thus, the photoreceptor according to this exemplary embodiment can maintain its excellent electrophotographic characteristics for a long time. Accordingly, the photoreceptor according to this exemplary embodiment is favorably applicable to various electrophotographic fields such as copier (black and white copier, multi-color copier, full-color copier; analog copier, digital copier), printer (laser printer, LED printer, liquid-crystal shutter printer), facsimile, platemaker and equipment capable of functioning as a plurality of them.

The electrophotographic photoreceptor according to this exemplary embodiment is electrified in use by corona discharge (corotron, scorotron), contact charging (charge roll, charge brush) or the like. For exposure, a halogen lamp, a fluorescent lamp, laser (semiconductor, He—Ne), LED or a photoreceptor internal exposure system may be used. For image development, dry developing such as cascade developing, two-component magnetic brush developing, one-component insulating toner developing and one-component conductive toner developing, and wet developing may be used. For transfer, electrostatic transfer such as corona transfer, roller transfer and belt transfer, pressure transfer and adhesive transfer may be used. For fixing, heat roller fixing, radiant flash fixing, open fixing, pressure fixing and the like may be used. For cleaning and neutralizing, brush cleaner, magnetic brush cleaner, electrostatic brush cleaner, magnetic roller cleaner, blade cleaner and those in which cleaner is omitted may be used. Examples of a resin for toner are styrene-base resin, styrene-acrylic base copolymer resin, polyester, epoxy resin and cyclic hydrocarbon polymer. The toner may be spherical or amorphous. The toner may also be controlled to have a certain shape (such as spheroidal shape and potato shape). The toner may be pulverized toner, suspension-polymerized toner, emulsion-polymerized toner, chemically-pelletized toner, or ester-elongation toner.

Second Embodiment

Next, a polycarbonate polymer (hereinafter, occasionally referred to as "copolymerized PC") of the second exemplary embodiment according to the invention will be described in detail.

In describing this exemplary embodiment, what has been described in the above first exemplary embodiment will be omitted or simplified.

[Structure of Copolymerized PC]

The copolymerized PC according to this exemplary embodiment includes a monomer unit represented by a formula (1B) below and a monomer unit represented by a formula (2) below.

[Chemical Formula 20]

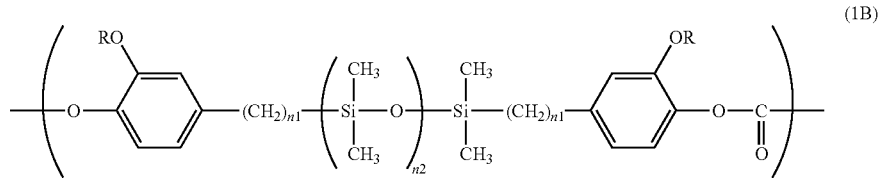

In the formula (1B), R represents an alkyl group having 1 to 3 carbon atoms; n1 is an integer in a range of 2 to 4; and n2 is an integer in a range of 55 to 700.

[Chemical Formula 21]

In the formula (2), Ar represents a divalent aromatic group.

A haze of a solution that is obtained by dissolving the copolymerized PC according to this exemplary embodiment in THF (tetrahydrofuran) at a concentration of 10 mass % is 5% or less (according to JIS K7105, optical path length of 10 mm). A haze of a solution that is obtained by dissolving the copolymerized PC according to this exemplary embodiment in THF (tetrahydrofuran) at a concentration of 25 mass % is preferably 10% or less.

Such a copolymerized PC that exhibits a high haze in the above predetermined solution, in other words, causes white turbidity when dissolved in THF may be obtained when a monomer corresponding to the formula (1B) (e.g., a formula (6B) below) is nonuniformly copolymerized with a monomer corresponding to the formula (2) (e.g., a formula (7) below). Alternatively, such a copolymerized PC may be obtained when a siloxane part forms a domain and the copolymerized PC is not uniform as a whole, even though the monomers are uniformly copolymerized. In the copolymerized PC having such a nonuniform structure, for example when the copolymerized PC is wet-molded and used as a binder resin for the electrophotographic photosensitive body, the nonuniform part becomes a trap-site at charge-transfer, thereby deteriorating electrical characteristics (e.g., photoconductor characteristics) of the electrophotographic photosensitive body. On the other hand, when n2 in the formula (1B) above is small, i.e., siloxane chain length is short, scratch resistance of the electrophotographic photosensitive body is reduced.

In the monomer unit represented by the formula (1B) to form copolymerized PC according to this exemplary embodiment, a siloxane chain length (n2) represented by the repeating number of the dimethylsiloxane unit is in a range of 55 to 700, preferably 55 to 350, more preferably 55 to 160.

When the siloxane chain length is less than 55, a molding product made of the copolymerized PC is poor in wear resistance (scratch resistance), which is not suitable for an electrophotographic photoreceptor. On the other hand, when the siloxane chain length is more than 700, the copolymerzed PC is easily whitened when dissolved in a solvent such as THF. A molding product obtained by coating such a solution as a coating liquid is poor not only in transparency but also in electrical characteristics (photoconductor characteristics), which is not suitable for an electrophotographic photoreceptor.

A content of the monomer unit (polysiloxane unit) represented by the formula (1B) according to the copolymerized PC of this embodiment is preferably in a range of 0.01 to 50 mass % of the total polycarbonate copolymer, more preferably in a range of 0.05 to 20 mass %, further preferably in a range of 0.1 to 10 mass %, most preferably in a range of 0.5 to 5 mass % in consideration of characteristics as a binder resin for the electrophotographic photoreceptor as well as electrical characteristics (photoconductor characteristics) and scratch resistance of the final electrophotographic photoreceptor.

When a mass fraction of the monomer unit is less than 0.01 mass %, the obtained electrophotographic photoreceptor unfavorably exhibits insufficient scratch resistance. When the mass fraction of the monomer unit is more than 50 mass %, the strength of the electrophotographic photoreceptor is lowered, so that scratch resistance is unfavorably lowered.

The mass fraction of the siloxane chain length and the formula (1B) is preferably in the range mentioned above.

As long as an object of the invention is not hampered, the copolymerized PC according to this exemplary embodiment may contain a monomer unit (repeating unit) other than the monomer unit represented by the formula (1B) and the monomer unit represented by the formula (2).

[Manufacturing Method of Copolymerized PC]

A copolymerized PC according to this exemplary embodiment can be easily manufactured by reacting carbonate-ester-forming compound with a mixed monomer of a polysiloxane monomer represented by a formula (6A) below (hereinafter, occasionally referred to as "PDMS monomer") and a monomer represented by a formula (7) below.

[Chemical Formula 22]

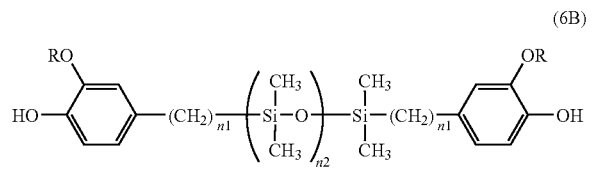

(6B)

In the formula, R represents an alkyl group having 1 to 3 carbon atoms; n1 is an integer in a range of 2 to 4; and n2 is an integer in a range of 55 to 700.

[Chemical Formula 23]

HO—Ar—OH            (7)

In the formula, Ar represents a divalent aromatic group.

Examples of the monomer represented by the formula (6B) are polysiloxane compounds such as 2-[4-hydroxy-3-methoxyphenyl]ethyl(polydimethylsiloxy)dimethylsilylethyl]-3-methoxy-4-hydroxybenzene, 3-[4-hydroxy-3-methoxyphenyl]propyl(polydimethylsiloxy)dimethylsilylpropyl]-3-methoxy-4-hydroxybenzene, and 4-[4-hydroxy-3-methoxyphenyl]butyl(polydimethylsiloxy)dimethylsilylbutyl]-3-methoxy-4-hydroxybenzene.

Examples of the monomer (divalent phenol) represented by the formula (7) are the same as the compounds of the first exemplary embodiment described above.

The copolymerized PC according to this exemplary embodiment can be easily obtained by conducting interfacial polycondensation with use of the monomer represented by the formula (6B) and the monomer represented by the formula (7). For instance, by conducting interfacial polycondensation under the presence of an acid-binding agent with use of various carbonyl dihalide such as phosgene, halo formates such as chloroformate compounds or a carbonate ester compound, carbonate ester bonding can be favorably formed. The above reaction(s) is conducted under the presence of a terminal terminator and/or a branching agent as needed. Alternatively, in manufacturing the copolymerized PC according to this exemplary embodiment, the monomer (divalent phenol) represented by the formula (7) may be a ternary copolymer in a combination of the biphenol compound and the bisphenols.

For manufacturing of the copolymerized PC, various methods are specifically usable. According to a usable exemplary method, polycarbonate oligomer is manufactured by reacting the bisphenol compound and/or the biphenol compound represented by the formula (7) with phosgene, and then the polycarbonate oligomer is reacted with the monomer represented by the formula (6B) under the presence of a mixture of the above solvent and an alkali aqueous solution of the above acid-binding agent. Alternatively, the above divalent phenol and phosgene may be reacted with each other in the mixture of the solvent and the alkali aqueous solution. Usually, the former method (i.e., the method in which polycarbonate oligomer is manufactured in advance) is preferable in terms of efficiency.

The organic phase containing the polycarbonate oligomer obtained by the same manufacturing method as the first exemplary embodiment is added with the monomer represented by the formula (6B) for reaction. The reaction temperature is 0 to 150 degrees C., preferably 5 to 40 degrees C., particularly preferably 5 to 25 degrees C. Particularly by conducting the reaction at the reaction temperature of 25 degrees C. or less, yellowness of the generated copolymerized PC can be preferably reduced.

A reaction pressure may be any one of a reduced pressure, a normal pressure and an added pressure. Typically, the reaction can be favorably performed under a pressure that is approximately equal to the normal pressure or a self-pressure of the reaction system. The reaction time, which is dependant on the reaction temperature, is typically in a range of 0.5 minute to 10 hours, preferably 1 minute to 2 hours.

In accordance with increase in the number of the repeating unit of polydimethylsiloxane, an obtained copolymerized PC is easily whitened (increased in haze) in the THF solution under the same polymerization conditions. In order to avoid white turbidity, it is required to decrease a solid concentration (a content of polymerizable component in a solvent) at polymerization in accordance with increase in the number of the repeating unit of polydimethylsiloxane. For instance, the solid content concentration of polycarbonate oligomer is in a range below in accordance with the siloxane chain length (repeating unit number). Although methylene chloride is suitable for the solvent, but other solvents exhibit a similar tendency.

Chain Length 55: 150 g/L or less
Chain Length 92: 120 g/L or less
Chain Length 137: 100 g/L or less
Chain Length 158: 60 g/L or less
Chain Length 300: 30 g/L or less At the time of the reaction, the divalent phenol is preferably added in a form of an organic-solvent solution and/or an alkali aqueous solution. The order of the addition is not specifically limited. In the above manufacturing method, the catalyst, the terminal terminator, the branching agent and the like may be added as needed at the time of manufacturing polycarbonate oligomer or at the time of subsequent polymerization reaction, or both at the time of manufacturing polycarbonate oligomer and at the time of subsequent polymerization reaction.

The copolymerized PC thus obtained is a copolymer formed of the repeating unit(s) represented by the formula (1B) and the repeating unit(s) represented by the formula (2).

As long as an object of the invention is not hampered, the copolymerized PC may contain a polycarbonate unit having a structure unit other than those of the formulae (1B) and (2), or a unit having a polyester structure, a polyurethane structure or a polyether structure.

Third Embodiment

Next, a polycarbonate resin (hereinafter, occasionally referred to as just "PC resin") as a polycarbonate polymer of the third exemplary embodiment according to the invention will be described in detail.

In describing this exemplary embodiment, what has been described in the above first and second exemplary embodiments will be omitted or simplified.

[Structure of PC Resin]

A PC resin according to this exemplary embodiment contains a monomer unit represented by a formula (2) below and has a structure in which at least one end of the PC resin is terminated by a terminal group represented by a formula (1C) below.

[Chemical Formula 24]

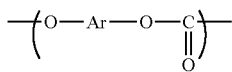

(2)

In the formula (2), Ar represents a divalent aromatic group.

[Chemical Formula 25]

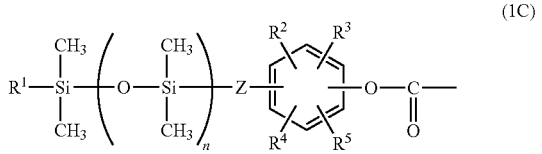

(1C)

In the formula (1C), Z is an aliphatic hydrocarbon group having 2 to 6 carbon atoms, preferably an alkylene group, particularly methylene chain; R represents an aliphatic hydrocarbon group having 1 to 6 carbon atoms; $R^2$ to $R^5$ each independently represent a hydrogen atom, an aliphatic hydrocarbon group having 1 to 30 carbon atoms, an alkoxy group having 1 to 6 carbon atoms or an aromatic hydrocarbon group having 6 to 12 carbon atoms; and n is an integer in a range of 40 to 700.

When n representing the repeating number of the siloxane unit (i.e. siloxane chain length) is less than 40, scratch resistance of the PC resin used as a binder resin for the electrophotographic photoreceptor is unfavorably deteriorated. When n is more than 700, a coating liquid that is obtained as a coating binder resin for an electrophotographic photoreceptor by dissolving the PC resin in THF and the like is unfavorably whitened. When the whitened coating liquid is coated, a finally obtained electrophotographic photoreceptor exhibits poor photoconductor characteristics.

Accordingly, the siloxane chain length (n) is preferably in a range of 50 to 350, more preferably in a range of 55 to 220, further preferably in a range of 60 to 160.

Alternatively, the terminal group of the formula (1C) may terminate both ends of the PC resin, or the other end of the PC resin may be terminated by other terminal terminators such as alkylphenol.

A haze of a solution that is obtained by dissolving the copolymerized PC according to this exemplary embodiment in THF (tetrahydrofuran) at a concentration of 10 mass % is 5% or less (according to JIS K7105, optical path length of 10 mm). A haze of a solution that is obtained by dissolving the copolymerized PC according to this exemplary embodiment in THF (tetrahydrofuran) at a concentration of 25 mass % is preferably 10% or less.

In such a THF solution exhibiting a high haze, in other words, in the PC resin causing white turbidity when, for example, the PC resin is wet-molded and used as a binder resin for the electrophotographic photoreceptor, whitened part becomes a trap-site at charge-transfer, thereby deteriorating electrophotography characteristics (e.g., sensitivity).

Such a PC resin that exhibits a high haze in the above predetermined solution, in other words, causes white turbidity when dissolved in THF may be obtained, for instance, when a monomer corresponding to a terminal group represented by the formula (1C) (e.g., a formula (6C) below) is nonuniformly copolymerized with a monomer corresponding to the formula (2) (e.g., a formula (7) below). Alternatively, such a PC resin may be obtained when a siloxane part forms a domain and the PC resin is not uniform as a whole, even though the monomers are uniformly copolymerized. In the PC resin having such a nonuniform structure when, for example, the copolymerized PC is wet-molded and used as a binder resin for the electrophotographic photoreceptor, the nonuniform part becomes a trap-site at charge-transfer, thereby presumably deteriorating electrical characteristics (e.g., photoconductor characteristics) of the electrophotographic photoreceptor. On the other hand, when n in the formula (1C) above is small, i.e., siloxane chain length is short, scratch resistance of the electrophotographic photoreceptor is reduced.

In the PC resin according to this exemplary embodiment, it is preferable that Ar in the formula (2) includes at least one of functional groups represented by a formula (3B) below.

[Chemical Formula 26]

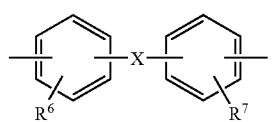

(3B)

In the formula (3B), $R^6$ and $R^7$ are each independently a functional group selected from the group consisting of hydrogen, a trifluoromethyl group, a halogen atom, an alkyl group having 1 to 10 carbon atoms, an aryl group having 6 to 12 carbon atoms, an alkyl group having 3 to 12 carbon atoms, preferably 1 to 6 carbon atoms, an aryl group having 6 to 12 carbon atoms, preferably 6 to 10 carbon atoms, an cycloalkyl group having 3 to 12 carbon atoms, preferably 5 to 9 carbon atoms, an alkoxy group having 1 to 6 carbon atoms and an aryloxy group having 6 to 12 carbon atoms, preferably 6 to 10 carbon atoms. Examples of the halogen atom are fluorine, chlorine, bromine and iodine. Examples of the alkyl group having 1 to 10 carbon atoms are a methyl group, ethyl group, n-propyl group, isopropyl group, n-butyl group, isobutyl group, sec-butyl group, tert-butyl group, pentyl groups, hexyl group, heptyl groups, octyl groups and 2-methoxyethyl group. Examples of the aryl group having 6 to 12 carbon atoms are a phenyl group, tolyl group and xylyl group. Examples of the cycloalkyl group having 3 to 12 carbon atoms are a cyclopropyl group, cyclobutyl group, cyclopentyl group and cyclohexyl group. Examples of the alkoxy group having 1 to 6 carbon atoms are a methoxy group, ethoxy group, n-propoxy group, isopropoxy group, n-butoxy group, isobutoxy group, sec-butoxy group, tert-butoxy group and pentoxy groups. Examples of the aryloxy group having 6 to 12 carbon atoms are a phenoxy group, 2,6-dimethylphenoxy group and naphthyloxy group.

In the formula (3B), X represents a functional group selected from the group consisting of: a single bond; —O—; —S—; —SO—; —SO$_2$—; —CO—; —CX$^1$X$^2$— (in which X$^1$ and X$^2$ each independently represent a functional group selected from the group consisting of a hydrogen atom, a trifluoromethyl group, a substituted or unsubstituted alkyl group having 1 to 10 carbon atoms and a substituted or unsubstituted aryl group having 6 to 12 carbon atoms); a substituted or unsubstituted cycloalkylidene group having 5 to 11 carbon atoms, preferably 5 to 9 carbon atoms; a substituted or unsubstituted α,ω-alkylene group having 2 to 12 carbon atoms, preferably 2 to 6 carbon atoms; a substituted or unsubstituted, 9-fluorenylidene group; a substituted or unsubstituted arylene group having 6 to 12 carbon atoms, preferably 6 to 10 carbon atoms; a divalent functional group derived from terpenes represented by a formula (4B) below; and alkylidenearylene-alkylidene group having 8 to 16 carbon atoms. When X$^1$ and X$^2$ are both methyl groups, X is not —CX$^1$X$^2$-alone. For instance, when bisphenol A is applied as the monomer corresponding to the formula (2) in combination with the monomer (terminal terminator) corresponding to the formula (1C) to manufacture a binary copolymer, high crystallinity of the obtained polymer affects solubility thereof, which limits a solvent to be used in manufacturing a coating liquid. Accordingly, when X$^1$ and X$^2$ are both methyl groups, it is preferable that X also includes a structure unit such as a single bond to provide a copolymerized PC resin.

[Chemical Formula 27]

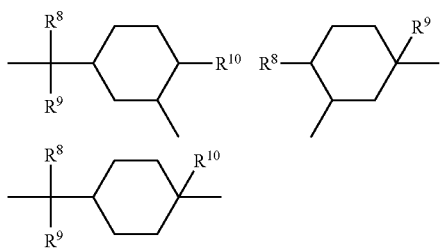

(4B)

In the above formula, R$^8$ to R$^{10}$ each represent the same functional group as R$^6$ and R$^7$.

[Chemical Formula 28]

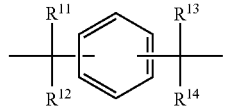

(5B)

In the above formula, R$^{11}$ to R$^{13}$ each represent the same functional group as R$^6$ and R$^7$.

Among X in the formula (3B), X$^1$ and X$^2$ in —CX$^1$X$^2$— are preferably a set of hydrogen and a methyl group or a set of a methyl group and an ethyl group. With this arrangement, a polycarbonate resin exhibiting excellent scratch resistance can be obtained although depending on siloxane chain length (n) in the formula (1C).

Examples of the substituted or unsubstituted cycloalkylidene group having 5 to 11 carbon atoms in X are a cyclopentylidene group, a cyclohexylidene group and a cycloheptylidene group. Examples of the substituted or unsubstituted α,ω-alkylene group having 2 to 12 carbon atoms are α,ω-ethylene group, α,ω-propylene group and α,ω-butylene group. Examples of the substituted or unsubstituted arylene group having 6 to 12 carbon atoms are a phenylene group, an alkyl-substituted phenylene group, a naphthylene group and an alkyl-substituted naphthylene group.

Examples of such a combination of the functional group represented by the above formula (3B) to form the monomer unit represented by the formula (2) are (A) a combination of a functional group in which X is a single bond and a functional group in which X is not a single bond, (B) a combination of a functional group in which X is a substituted or unsubstituted cycloalkylidene group having 5 to 11 carbon atoms and a functional group in which X is other than a substituted or unsubstituted cycloalkylidene group having 5 to 11 carbon atoms, (C) a combination of a functional group in which X is a substituted or unsubstituted 9,9-fluorenylidene group and a functional group in which X is other than a substituted or unsubstituted 9,9-fluorenylidene group and (D) a combination of a functional group in which X is an alkylidene-arylene-alkylidene group having 8 to 16 carbon atoms and a functional group in which X is other than an alkylidene-arylene-alkylidene group having 8 to 16 carbon atoms.

A content of the terminal group (hereinafter, occasionally referred to as "polysiloxane") represented by the formula (1C) in the PC resin 1 according to this exemplary embodiment is not particularly limited, but is preferably in a range of 0.01 to 50 mass % of the total polycarbonate resin, more preferably in a range of 0.05 to 20 mass %, further preferably in a range of 0.1 to 10 mass %, most preferably in a range of 0.5 to 5 mass % in consideration of characteristics as a binder resin for the electrophotographic photoreceptor as well as electrical characteristics (photoconductor characteristics) and scratch resistance of the final electrophotographic photoreceptor. When a mass fraction of polysiloxane is less than 0.01 mass %, the obtained electrophotographic photoreceptor unfavorably exhibits insufficient scratch resistance. When the mass fraction of polysiloxane is more than 50 mass %, the strength of the electrophotographic photoreceptor is lowered, so that scratch resistance is unfavorably lowered.

The siloxane chain length and the mass fraction of polysiloxane are both preferably in the same range as mentioned above.

In a solution where the PC resin according to this exemplary embodiment is dissolved in a solvent of methylene chloride at a concentration of 0.5 g/dl, the PC resin preferably exhibits reduced viscosity [$\eta_{sp}/C$] at 20 degrees C. in a range of 0.1 to 5 dl/g, more preferably 0.2 to 3 dl/g and particularly preferably 0.3 to 2.5 dl/g. When the reduced viscosity [$\eta_{sp}/C$] is less than 0.1 dl/g, scratch resistance of the obtained electrophotographic photoreceptor may be insufficient. On the other hand, when the reduced viscosity [$\eta_{sp}/C$] is more than 5 dl/g, solution viscosity of the copolymerized PC may be so increased at manufacturing photoreceptors that productivity of the electrophotographic photoreceptor may be unfavorably lowered.

When the PC resin is a ternary copolymer formed of the above specified polysiloxane (terminal group), biphenol unit and bisphenol unit, the solubility in the coating liquid for forming the electrophotographic photoreceptor is increased, thereby favorably increasing scratch resistance of the electrophotographic photoreceptor.

For instance, the monomer unit represented by the formula (2) is preferably a combination of a so-called biphenol unit in which X in the formula (3B) is a single bond and a bisphenol unit in which X is —$CX^1X^2$— and/or a cycloalkylidene.

The biphenol unit is also included in the bisphenol unit in a broad meaning; however, the biphenol unit of the present invention is particularly when X represents a single bond. Monomers corresponding to these may be respectively described as a biphenol compound and a bisphenol compound to distinguish each other.

As long as an object of the invention is not hampered, the PC resin according to this embodiment may contain a monomer unit (repeating unit) other than the monomer unit represented by the formula (2).

[Manufacturing Method of PC Resin]

A main chain of the PC resin according to this exemplary embodiment can be easily obtained by conducting interfacial polycondensation with use of, for instance, the monomer represented by a formula (7) below. A particular structure of Ar in the formula (7) below is the same as that of Ar in the formula (2).

[Chemical Formula 29]

HO—Ar—OH (7)

The PC resin according to this exemplary embodiment includes the specified polysiloxane structure (see the formula (1C)) as a terminal group. In order to provide such a structure, a method in which a single functional phenol represented by a formula (6C) below as a terminal terminator is coexisted during polymerization may be used. Such a single functional phenol may be combined with polysiloxane and be singularly coexisted in a polymer, or may be used together with other single functional phenols such as p-tert-butylphenol, phenol, cumylphenol, octylphenol, and nonylphenol. Alternatively, as another method, hydrosilylation reaction of polysiloxane having a Si—H structure at one terminal to polycarbonate having a carbon-carbon double bond at a terminal can be applied in manufacturing.

[Chemical Formula 30]

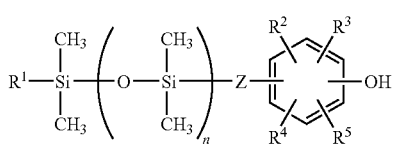

(6C)

A particular structure (Z, $R^1$ to $R^5$ and n) in the formula (6C) is the same as that of the formula (1C).

Examples of the monomer (divalent phenol) represented by the formula (7) are the same as the compounds of the first exemplary embodiment described above.

The PC resin according to this exemplary embodiment can be easily obtained by conducting interfacial polycondensation with use of the monomer represented by the formula (7). For instance, by conducting interfacial polycondensation under the presence of an acid-binding agent with use of various carbonyl dihalide such as phosgene, halo formates such as chloroformate compounds or a carbonate ester compound, carbonate ester bonding can be favorably formed. In the reaction, the single functional phenol represented by the formula (6C) may be present as a terminal terminator. Alternatively, a branching agent may be present at polymerization.

In manufacturing the PC resin according to this exemplary embodiment, the monomer (divalent phenol) represented by the formula (7) may be a copolymer in a combination of the biphenol compound and the bisphenols compound.

Besides the terminal terminator represented by the formula (6C), the terminal terminator described in the first exemplary embodiment may be added.

For manufacturing of the PC resin, various methods are specifically usable. According to a usable exemplary method, polycarbonate oligomer is manufactured by reacting the bisphenol compound and/or the biphenol compound represented by the formula (7) with phosgene, and then the polycarbonate oligomer is reacted with the single functional phenol (polysiloxane) represented by the above formula (6C) under the presence of a mixture of the above solvent and an alkali aqueous solution of the above acid-binding agent. Alternatively, the above divalent phenol and phosgene may be reacted with each other in the mixture of the solvent and the alkali aqueous solution. Usually, the former method (i.e., the method in which polycarbonate oligomer is manufactured in advance) is preferable in terms of efficiency.

The organic phase containing the polycarbonate oligomer obtained by the same manufacturing method as the first exemplary embodiment is added with polysiloxane represented by the formula (6C) for reaction. The reaction temperature is 0 to 150 degrees C., preferably 5 to 40 degrees C., particularly preferably 5 to 20 degrees C. Particularly by conducting the reaction at the reaction temperature of 20 degrees C. or less, yellowness of the generated PC resin can be restrained.

A reaction pressure may be any one of a reduced pressure, a normal pressure and an added pressure. Typically, the reaction can be favorably performed under a pressure that is approximately equal to the normal pressure or a self-pressure of the reaction system. The reaction time, which is dependant on the reaction temperature, is typically in a range of 0.5 minute to 10 hours, preferably 1 minute to 2 hours.

In accordance with increase in the number of the repeating unit of polysiloxane, the obtained PC resin is easily whitened (increased in haze) in the THF solution under the same polymerization conditions. In order to avoid white turbidity, it is required to decrease a solid concentration of the oligomer (a content of polymerizable component in a solvent) at polymerization in accordance with increase in the number of the repeating unit of polysiloxane. For instance, the solid content concentration of polycarbonate oligomer is in a range below in accordance with the siloxane chain length (repeating unit number). Although methylene chloride is suitable for the solvent, but other solvents exhibit a similar tendency.

Chain Length 40 to 58: 150 g/L or less
Chain Length 59 to 92: 120 g/L or less
Chain Length 93 to 137: 100 g/L or less Chain Length 138 to 158: 60 g/L or less
Chain Length 159 to 350: 30 g/L or less
Chain Length 351 to 700: 10 g/L or less In the reaction, the divalent phenol is preferably added in a form of an organic-solvent solution and/or an alkali aqueous solution. The order of the addition is not specifically limited. In the above manufacturing method, the catalyst, the terminal terminator, the branching agent and the like may be added as needed at the time of manufacturing polycarbonate oligomer or at the time of subsequent polymerization reaction, or both at the time of manufacturing polycarbonate oligomer and at the time of subsequent polymerization reaction.

The PC resin thus obtained is a polymer that contains the repeating unit(s) represented by the formula (2) and has a terminal structure represented by the formula (1C) at least one terminal thereof.

As long as an object of the invention is not hampered, the PC resin may contain a polycarbonate unit having a structure unit other than those of the formula (2), or a unit having a polyester structure, a polyurethane structure or a polyether structure.

For controlling the reduced viscosity [$\eta_{sp}$/C] (a value correlated to the viscosity-average molecular weight) of the obtained PC resin to be within the above-described range, various methods (such as a method of selecting the reaction conditions and a method of adjusting the use amount of the branching agent and a molecular weight adjuster) are available. In addition, if necessary, the obtained PC resin may be subjected to a physical treatment such as mixing and cutoff and/or a chemical treatment such as polymer reaction, cross linking or partial degradation, so that the PC resin having a predetermined reduced viscosity [$\eta_{sp}$/C] may be obtained.

The obtained reaction product (crude product) may be subjected to various aftertreatments such as known separation and refinement, so that the PC resin having desirable purity (desirable refining degree) may be obtained.

EXAMPLES

Next, examples and comparatives of the above-described exemplary embodiments according to the invention will be described in detail. However, the invention is not limited to the examples but may include various modifications and applications as long as such modifications and applications do not depart from a technical idea of the invention.
<Example(s) of First Embodiment>
A copolymerized PC was manufactured by conducting ternary polycondensation with use of a polysiloxane monomer represented by the formula (6A) and a bisphenol monomer represented by the formula (7) (a combination of bisphenols compounds and biphenol compounds), and an electrophotographic photoreceptor was manufactured from the copolymerized PC. Subsequently, various evaluations were conducted.

Manufacturing Example

Preparation of Oligomer

Manufacturing Example 1

Synthesis of Bisphenol a Oligomer

A solution prepared by dissolving 0.2 kg of 2,2-bis(4-hydroxyphenyl) propane in 1.3 kg of aqueous sodium hydroxide having a concentration of 10 mass % was mixed with 1.0 kg of methylene chloride. Then, while the solution was being stirred, phosgene gas was blown into the solution while cooling at 1 L/min until pH becomes 9 or less in order to remove reaction heat. Subsequently, the reaction solution was separated in a stand still manner, and a methylene chloride solution of an oligomer which has 2 to 6 polymerization degree and a chloroformate group at its molecular terminal was obtained as an organic layer (a solid content concentration of 0.28 kg/L). This oligomer is referred to as "PCO-A" hereinafter.

Manufacturing Example 2

Synthesis of Bisphenol Z Oligomer

A solution prepared by dissolving 0.2 kg of 1,1-bis(4-hydroxyphenyl) cyclohexane in 1.2 kg of aqueous potassium hydroxide having a concentration of 16 mass % was mixed with 1.3 kg of methylene chloride. Then, while the solution was being stirred, phosgene gas was blown into the solution while cooling at 1 L/min until pH becomes 9 or less. Subsequently, the reaction solution was separated in a stand still manner, and a methylene chloride solution of an oligomer which has 2 to 6 polymerization degree and a chloroformate group at its molecular terminal was obtained as an organic layer (a solid content concentration of 0.26 kg/L). This oligomer is referred to as "PCO-Z" hereinafter.

Manufacturing Example 3

Synthesis of Bisphenol C Oligomer

A solution prepared by dissolving 0.2 kg of 2.2-bis(3-methyl-4-hydroxyphenyl) propane in 1.2 kg of aqueous potassium hydroxide having a concentration of 16 mass % was mixed with 1.0 kg of methylene chloride. Then, while the solution was being stirred, phosgene gas was blown into the solution while cooling at 1 L/min until pH becomes 9 or less. Subsequently, the reaction solution was separated in a stand still manner, and a methylene chloride solution of an oligomer which has 2 to 6 polymerization degree and a chloroformate group at its molecular terminal was obtained as an organic layer (a solid content concentration of 0.30 kg/L). This oligomer is referred to as "PCO-C" hereinafter.

Manufacturing Example 4

Synthesis of Bisphenol E Oligomer

A solution prepared by dissolving 0.2 kg of 1,1-bis(4-hydroxyphenyl) ethane in 1.2 kg of aqueous sodium hydroxide having a concentration of 12 mass % was mixed with 1.0 kg of methylene chloride. Then, while the solution was being stirred, phosgene gas was blown into the solution while cooling at 1 L/min until pH becomes 9 or less. Subsequently, the reaction solution was separated in a stand still manner, and a methylene chloride solution of an oligomer which has 2 to 6 polymerization degree and a chloroformate group at its molecular terminal was obtained as an organic layer (a solid content concentration of 0.26 kg/L). This oligomer is referred to as "PCO-E" hereinafter.

Manufacturing Example 5

Synthesis of Bisphenol B Oligomer

A solution prepared by dissolving 0.2 kg of 2,2-bis(4-hydroxyphenyl) butane in 1.0 kg of aqueous sodium hydroxide having a concentration of 12 mass % was mixed with 1.0 kg of methylene chloride. Then, while the solution was being stirred, phosgene gas was blown into the solution while cooling at 1 L/min until pH becomes 9 or less. Subsequently, the reaction solution was separated in a stand still manner, and a methylene chloride solution of an oligomer which has 2 to 6 polymerization degree and a chloroformate group at its molecular terminal was obtained as an organic layer (a solid content concentration of 260 g/L). This oligomer is referred to as "PCO-B" hereinafter.

Manufacturing Example 6

Synthesis of Bisphenol I Oligomer

A solution prepared by dissolving 0.2 kg of 1,1-bis(4-hydroxyphenyl)-3,3,5-trimethyl-cyclohexane in 1.2 kg of aqueous potassium hydroxide having a concentration of 16 mass % was mixed with 1.3 kg of methylene chloride. Then, while the solution was being stirred, phosgene gas was blown into the solution while cooling at 1 L/min until pH becomes 9 or less. Subsequently, the reaction solution was separated in a stand still manner, and a methylene chloride solution of an oligomer which has 2 to 6 polymerization degree and a chloroformate group at its molecular terminal was obtained as an organic layer (a solid content concentration of 0.26 kg/L). This oligomer is referred to as "PCO-I" hereinafter.

Manufacturing Example 7

Synthesis of Bisphenol PM Oligomer

A solution prepared by dissolving 0.2 kg of 1,3-bis(2-(4-hydroxyphenyl)propyliden)benzene in 1.2 kg of aqueous potassium hydroxide having a concentration of 16 mass % was mixed with 1.3 kg of methylene chloride. Then, while the solution was being stirred, phosgene gas was blown into the solution while cooling at 1 L/min until pH becomes 9 or less. Subsequently, the reaction solution was separated in a stand still manner, and a methylene chloride solution of an oligomer which has 2 to 6 polymerization degree and a chloroformate group at its molecular terminal was obtained as an organic layer (a solid content concentration of 0.26 kg/L). This oligomer is referred to as "PCO-PM" hereinafter.

[Measuring Method of Haze]

The copolymerized PC was dissolved in THF at a concentration of 10 mass % and left in a stand still manner at 25 degrees C. for 12 hours. Subsequently, the obtained solution was uniformed and deaerated by a self-rotation mixer (manufactured by THINKY Corporation, "Awatori Rentaro" ARE-250) to provide a measuring sample.

After putting the sample into a glass cell (optical path width: 10 mm, external width: 30 mm, height: 50 mm) and confirming no foam left in the sample, a haze at 25 degrees C. was measured by using an automatic direct-reading haze computer (manufactured by Suga Test Instruments Co., Ltd.: HGM-2D) according to JIS K7105. At this time, a diameter of a slit to pass light was 13 mm for measurement.

Example 1-1

Manufacturing of Copolymerized PC

In a reaction vessel equipped with a stirring motor, a stifling blade and a baffle plate, PCO-A (96 mL) was added with methylene chloride (354 mL) to adjust a solid content concentration at 0.06 kg/L in the methylene chloride. To this solution, 0.3 g of polydimethysiloxane (hereinafter, referred to as S monomer) having aromatic hydroxy groups at both terminals that was synthesized by reacting polydimethysiloxane having SiH groups at both terminals thereof with o-allylphenol under the presence of a platinum catalyst, and 0.36 g of p-tert-butylphenol (PTBP) as a terminal terminator were added and fully stirred for mixing. The used S monomer had 158 repeating units (S chain length) of dimethylsiloxane part.

After 30 mL of 2N aqueous sodium hydroxide separately prepared was added in this solution, 1 mL of triethylamine solution (7 vol %) was added with stirring. After 10 minutes, the whole amount of a monomer solution separately prepared was added to this solution and kept on stirring for another one hour. Here, the monomer solution was prepared by cooling 120 mL of 2N aqueous sodium hydroxide to the room temperature or less, adding 0.1 g of $Na_2S_2O_4$ and 7 g of 4,4'-biphenol (BP) and completely dissolving the added components.

The obtained reaction mixture was diluted with 2 L of methylene chloride and 1 L of water and washed. A lower layer was separated from the reaction mixture. Then, the lower layer reaction mixture was washed with 1 L of water for one time, with 1 L of 0.1N aqueous sodium hydroxide for one time, with 1 L of 0.01N hydrochloric acid for one time and with 1 L of water for three times in this order. The obtained methylene chloride solution was dropped into methanol with stirring. The obtained redeposit was filtered and dried to prepare a copolymerized PC(PC-1A).

(Evaluation of Copolymerized PC)

PC-1A was dissolved in methylene chloride to prepare a solution having a concentration of 0.5 g/dl. When reduced viscosity $[\eta_{sp}/C]$ thereof at 20 degrees C. was measured, the result was 1.14 dl/g. A chemical structure of the PC-1A was analyzed with $^1$H-NMR, and the PC-1A was found to be a copolymerized PC represented by the following formula (8A). Hereinafter, the following repeating units of a ternary copolymer are respectively denoted as a bisphenol unit, a biphenol unit and a polysiloxane unit. A mass fraction of the polysiloxane unit in the PC-1A was 1%. A viscosity average molecular weight of PC-1A was 50000 in calculation from the above reduced viscosity. PC-1A was dissolved at a concentration of 10 mass % in THF to prepare a solution. White turbidity thereof was visually observed and a haze of the solution was measured. The results are shown in Table 1.

[Chemical Formula 31]

(8A)

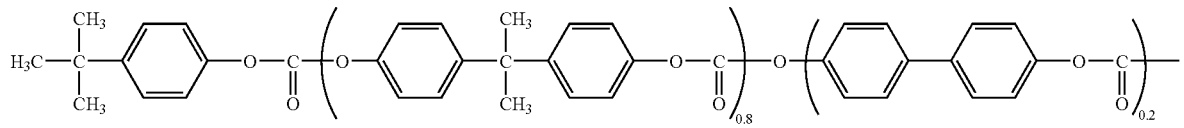

-continued

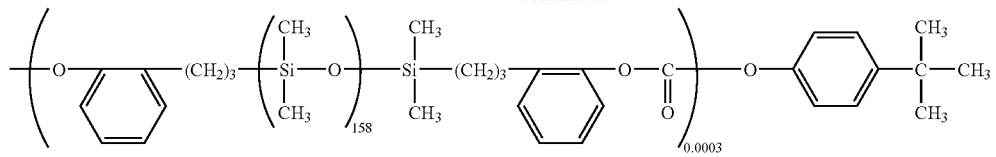

(Manufacturing of Electrophotographic Photoreceptor)

A film of polyethylene terephthalate resin on which aluminum metal was deposited was used as a conductive substrate. A charge generating layer and a charge transporting layer were sequentially coated on the surface of the conductive substrate to form a laminate sensitive layer, thereby providing an electrophotographic photoreceptor. 0.5 parts by mass of oxotitanium phthalocyanine was used as a charge generating material while 0.5 parts by mass of a polyvinyl butyral resin was used as a binder resin. The charge generating material and the binder resin were added into 19 parts by mass of methylene chloride (solvent) and dispersed with a ball mill. Then, the dispersion was applied onto the surface of the conductive-substrate film and dried, thereby providing a charge generating layer having a film thickness of approximately 0.5 μm.

Next, for use as a charge transport material, 0.5 g of a compound (CTM-1) represented by the following formula (9) and 0.5 g of the obtained copolymerized polycarbonate resin (PC-1A) were dispersed in 10 ml of tetrahydrofuran to prepare a coating liquid. This coating liquid did not cause white turbidity and gelation at the initial dissolution and after the coating liquid was left still for one month. The coating agent was applied onto the charge generating layer with an applicator and dried, thereby providing a charge transporting layer having a film thickness of approximately 20 μm.

[Chemical Formula 32]

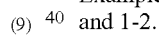
(9)
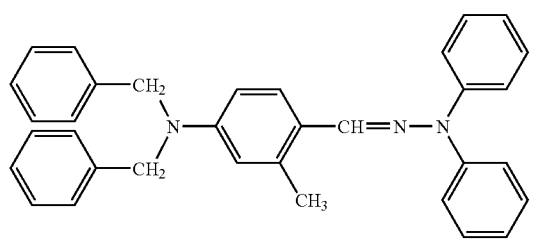

(Evaluation of Electrophotographic Photoreceptor)

Electrophotographic characteristics of the obtained electrophotographic photoreceptor were evaluated with an electrostatic charge tester EPA-8100 (manufactured by Kawaguchi Electric Works Co., Ltd.). Specifically, corona discharge of −6 kV was conducted in the static mode. Then, the initial surface potential ($V_O$), residual potential ($V_R$) in 5 seconds after light irradiation (10 Lux), and half-life exposure amount (initial sensitivity, $E_{1/2}$) were measured. Further, a commercially-available printer (FS-600, manufactured by Kyocera Corporation) was modified so as to be capable of measuring the surface potential of the photoreceptor. Then, the photoreceptor was mounted on a drum to be evaluated in terms of photoconductor characteristics. Evaluation was conducted on photoconductor characteristics (increase in residual potential after repeated use ($\Delta V_R$)) exhibited after the photoreceptor was repeatedly used without interposition of toner or paper for 24 hours under a high temperature and high humidity (35 degrees C., 85% RH).

Next, scratch resistance was evaluated as follows.

1.0 g of PC-1A and 1.0 g of the compound (CTM-1) represented by the formula (9) were weighed and dissolved in 12 mL of tetrahydrofuran (THF). This solution was coated onto a PET film (0.5 mm thick). A copolymerized PC cast film (30 μm) obtained after drying was provided as a test sample.

Next, by using Suga abrasion tester (manufactured by Suga Test Instruments Co., Ltd.), a PPC paper cut in 10 mm width was attached to an abrasion wheel with a double-faced adhesive tape, and then the sample was set to be reciprocated 100 times at a load of 20 gf. Reciprocation of the PPC paper under this load caused linear scratches on a sample surface. Particularly in the center part of the scratched sample, the number of the scratches in a direction orthogonal to a reciprocating direction of the paper was visually counted. An experiment was carried out in n=3, and scratch resistance was evaluated based on the following.

A case when the average number of the scratches visually recognized was 3 or less was noted as A, a case when that was in a range of 4 to 10 was noted as B and a case when that was 11 or more was noted as C. Such scratch resistance is assumed as scratch resistance when the polymerized PC was used as a binder resin for an electrophotographic photoreceptor. Accordingly, the scratch resistance is equal to that as the electrophotographic photoreceptor.

Table 1 shows evaluation results of Example 1-1, Examples 1-2 to 1-10 described below and Comparative 1-1 and 1-2.

Example 1-2

A copolymerized PC(PC-2A) was produced in the same manner as in Example 1-1, except that a content of PCO-A was changed from 96 mL to 241 mL and a content of methylene chloride was changed to 209 mL to adjust the solid content concentration at 0.15 kg/L in the methylene chloride; a content of BP, S chain length, a content of S and PTBP were respectively changed to 18 g, 58, 1.0 g and 0.81 g; and methylene chain length in S monomer (n1 in the formula (1A)) was 4, i.e., 4-(3-butenyl)-phenol was used in place of o-allylphenol. [$\eta_{sp}$/C] of PC-2A was 1.18 dl/g and viscosity average molecular weight thereof was 52000. A mole ratio of a bisphenol unit, a biphenol unit and a polysiloxane unit in PC-2A was 0.8:0.2:0.001. A mass fraction of the polysiloxane unit in the PC-2A was 1%. The same evaluation as in Example 1-1 was conducted on the PC-2A and an electrophotographic photoreceptor made of the PC-2A in the same manner as in Example 1-1.

Example 1-3

A copolymerized PC(PC-3A) was produced in the same manner as in Example 1-1, except that PCO-A (96 mL) was changed to PCO-Z (260 mL) and a content of methylene chloride was changed to 190 mL to adjust the solid content concentration at 0.15 kg/L in the methylene chloride; and a content of BP, S chain length, a content of S and PTBP were respectively changed to 12 g, 58, 2.3 g and 0.40 g. [$\eta_{sp}$/C] of PC-3A was 1.16 dl/g and viscosity average molecular weight thereof was 51000. A mole ratio of a bisphenol unit, a biphenol unit and a polysiloxane unit in PC-3A was 0.85:0.15:0.002. A mass fraction of the polysiloxane unit in the PC-3A was 3%.

The same evaluation as in Example 1-1 was conducted on the PC-3A and an electrophotographic photoreceptor made of the PC-3A in the same manner as in Example

Example 1-4

A copolymerized PC(PC-4A) was produced in the same manner as in Example 1-1, except that PCO-A (96 mL) was changed to PCO-Z (173 mL) and a content of methylene chloride was changed to 277 mL to adjust the solid content concentration at 0.10 kg/L in the methylene chloride; and a content of BP, S chain length, a content of S and PTBP were respectively changed to 8 g, 91, 1.5 g and 0.27 g. [$\eta_{sp}$/C] of PC-4A was 1.19 dl/g and viscosity average molecular weight thereof was 52000. A mole ratio of a bisphenol unit, a biphenol unit and a polysiloxane unit in PC-2A was 0.85:0.15:0.001. A mass fraction of the polysiloxane unit in the PC-4A was 3%.

The same evaluation as in Example 1-1 was conducted on the PC-4A and an electrophotographic photoreceptor made of the PC-4A in the same manner as in Example 1-1.

Example 1-5

A copolymerized PC(PC-5A) was produced in the same manner as in Example 1-1, except that PCO-A (96 mL) was changed to PCO-Z (104 mL) and a content of methylene chloride was changed to 346 mL to adjust the solid content concentration at 0.06 kg/L in the methylene chloride; a content of BP, S chain length, a content of S and PTBP were respectively changed to 5 g, 158, 0.9 g and 0.16 g; and p-allylphenol was used in place of o-allylphenol to provide a binding position of methylene chain at the para-position. [$\eta_{sp}$/C] of PC-5A was 1.15 dl/g and viscosity average molecular weight thereof was 50000. A mole ratio of a bisphenol unit, a biphenol unit and a polysiloxane unit in PC-5A was 0.85:0.15:0.001. A mass fraction of the polysiloxane unit in the PC-5A was 3%.

The same evaluation as in Example 1-1 was conducted on the PC-5A and an electrophotographic photoreceptor made of the PC-5A in the same manner as in Example 1-1.

Example 1-6

A copolymerized PC(PC-6A) was produced in the same manner as in Example 1-1, except that PCO-A (96 mL) was changed to PCO-E (173 mL) and a content of methylene chloride was changed to 277 mL to adjust the solid content concentration at 0.10 kg/L in the methylene chloride; and a content of 9,9-bis(3-methyl-4-hydroxyphenyl) fluorene in place of BP, S chain length, a content of S and PTBP were respectively changed to 23 g, 97, 1.3 g and 0.27 g. [$\eta_{sp}$/C] of PC-6A was 1.63 dl/g and viscosity average molecular weight thereof was 71000. A mole ratio of a bisphenol unit, a biphenol unit and a polysiloxane unit in PC-6A was 0.8:0.2:0.002. A mass fraction of the polysiloxane unit in the PC-6A was 2%.

The same evaluation as in Example 1-1 was conducted on the PC-6A and an electrophotographic photoreceptor made of the PC-6A in the same manner as in Example 1-1.

Example 1-7

A copolymerized PC(PC-7A) was produced in the same manner as in Example 1-1, except that PCO-A (96 mL) was changed to PCO-B (173 mL) and a content of methylene chloride was changed to 277 mL to adjust the solid content concentration at 0.10 kg/L in the methylene chloride; and a content of 9,9-bis(3-methyl-4-hydroxyphenyl) fluorene in place of BP, S chain length, a content of S and PTBP were respectively changed to 26 g, 80, 0.7 g and 1.10 g. [$\eta_{sp}$/C] of PC-7A was 0.56 dl/g and viscosity average molecular weight thereof was 23000. A mole ratio of a bisphenol unit, a biphenol unit and a polysiloxane unit in PC-7A was 0.8:0.2:0.0005. A mass fraction of the polysiloxane unit in the PC-7A was 1%.

The same evaluation as in Example 1-1 was conducted on the PC-7A and an electrophotographic photoreceptor made of the PC-7A in the same manner as in Example

Example 1-8

A copolymerized PC(PC-8A) was produced in the same manner as in Example 1-1, except that PCO-A (96 mL) was changed to PCO-C (150 mL) and a content of methylene chloride was changed to 300 mL to adjust the solid content concentration at 0.10 kg/L in the methylene chloride; and a content of 1,1-bis(4-hydroxyphenyl)1-phenylethane in place of BP, S chain length, a content of S and PTBP were respectively changed to 17 g, 80, 2.6 g and 0.35 g. [$\eta_{sp}$/C] of PC-8A was 0.71 dl/g and viscosity average molecular weight thereof was 30000. A mole ratio of a bisphenol unit, a biphenol unit and a polysiloxane unit in PC-8A was 0.8:0.2:0.003. A mass fraction of the polysiloxane unit in the PC-8A was 5%.

The same evaluation as in Example 1-1 was conducted on the PC-8A and an electrophotographic photoreceptor made of the PC-8A in the same manner as in Example 1-1.

Example 1-9

A copolymerized PC(PC-9A) was produced in the same manner as in Example 1-1, except that PCO-A (96 mL) was changed to PCO-Z (52 mL) and a content of methylene chloride was changed to 398 mL to adjust the solid content concentration at 0.03 kg/L in the methylene chloride; and a content of BP, S chain length, a content of S and PTBP were respectively changed to 2.4 g, 300, 0.5 g and 0.08 g. [$\eta_{sp}$/C] of PC-9A was 1.10 dl/g and viscosity average molecular weight thereof was 48000. A mole ratio of a bisphenol unit, a biphenol unit and a polysiloxane unit in PC-9A was 0.8:0.2:0.0004. A mass fraction of the polysiloxane unit in the PC-9A was 3%.

The same evaluation as in Example 1-1 was conducted on the PC-9A and an electrophotographic photoreceptor made of the PC-9A in the same manner as in Example

Example 1-10

A copolymerized PC(PC-10A) was produced in the same manner as in Example 1-1, except that PCO-A (96 mL) was changed to PCO-Z (52 mL) and a content of methylene chloride was changed to 398 mL to adjust the solid content concentration at 0.03 kg/L in the methylene chloride; and a content of BP, S chain length, a content of S and PTBP were respectively changed to 2.4 g, 158, 0.5 g and 0.08 g. [$\eta_{sp}/C$] of PC-10A was 1.12 dl/g and viscosity average molecular weight thereof was 49000. A mole ratio of a bisphenol unit, a biphenol unit and a polysiloxane unit in PC-10A was 0.8:0.2: 0.0008. A mass fraction of the polysiloxane unit in the PC-10A was 3%.

The same evaluation as in Example 1-1 was conducted on the PC-10A and an electrophotographic photoreceptor made of the PC-10A in the same manner as in Example Comparative 1-1

A copolymerized PC(PC-11A) was produced in the same manner as in Example 1-1, except that a content of PCO-A was changed from 96 mL to 289 mL and a content of methylene chloride was changed from 354 mL to 161 mL to adjust the solid content concentration at 0.18 kg/L in the methylene chloride; and a content of BP, S chain length, a content of S and PTBP were respectively changed to 21.6 g, 58, 1.2 g and 0.97 g.

The same evaluation as in Example 1-1 was conducted on the PC-11A. [$\eta_{sp}/C$] of PC-11A was 1.18 dl/g and viscosity average molecular weight thereof was 52,000. A mole ratio of a bisphenol unit, a biphenol unit and a polysiloxane unit in PC-11A was 0.8:0.2:0.01. A mass fraction of the polysiloxane unit in the PC-11A was 1%.

Comparative 1-2

PC-120A was produced in the same manner as in Comparative 1-1, except that S monomer of Comparative 1-1 was changed to S monomer having S chain length of 20.

The same evaluation as in Example 1-1 was conducted on the PC-12A. [$\eta_{sp}/C$] of PC-11A was 1.16 dl/g and viscosity average molecular weight thereof was 51,000. A mole ratio of a bisphenol unit, a biphenol unit and a polysiloxane unit in PC-12A was 0.85:0.15:0.006. A mass fraction of the polysiloxane unit in the PC-12A was 1%.

[Evaluation Result]

Table 1 shows evaluation results of Examples 1-1 to 1-10 and Comparatives 1-1 and 1-2. As is understood from Examples 1-1 to 1-10, an electrophotographic photoreceptor using the copolymerized PC according to the invention as a binder resin is excellent in electrical characteristics and scratch resistance. On the other hand, in Comparative 1-1, the THF solution is considerably whitened, so that dispersion of CTM-1 is deteriorated and an interfacial part generated by mal-dispersion becomes a trap-site at charge-transfer. As a result, Comparative 1-1 is poor in electrical characteristics. Specifically, in Table 1, since a minus value of the initial residual potential ($V_R$), the initial sensitivity ($E_{1/2}$), and increase in repeating residual potential ($\Delta V_R$) are large, clearness of electrophotographic image is poor. In Comparative 1-2, scratch resistance is poor because of short S chain length.

TABLE 1

| | Copolymerized PC | | Photographic Receptor | | | | |
|---|---|---|---|---|---|---|---|
| | Haze | White Turbidity Degree (Visually) | Scratch Resistance | Initial Surface Potential ($V_O$)(V) | Residual Potential ($V_R$)(V) | Initial Sensitivity ($E_{1/2}$)(Lux-sec) | Increase in Repeating Residual Potential ($\Delta V_R$) |
| Example 1-1 (PC-1A) | 0.6 | transparent | B | −720 | −10 | 0.82 | 10 |
| Example 1-2 (PC-2A) | 0.4 | transparent | B | −720 | −10 | 0.82 | 10 |
| Example 1-3 (PC-3A) | 0.4 | transparent | B | −720 | −10 | 0.82 | 10 |
| Example 1-4 (PC-4A) | 0.4 | transparent | A | −720 | −10 | 0.82 | 10 |
| Example 1-5 (PC-5A) | 0.6 | transparent | A | −720 | −10 | 0.82 | 10 |
| Example 1-6 (PC-6A) | 0.5 | transparent | A | −720 | −10 | 0.82 | 10 |
| Example 1-7 (PC-7A) | 0.3 | transparent | B | −720 | −10 | 0.82 | 10 |
| Example 1-8 (PC-8A) | 0.6 | transparent | B | −720 | −10 | 0.82 | 10 |
| Example 1-9 (PC-9A) | 3.6 | translucent 1) | A | −700 | −20 | 0.84 | 10 |
| Example 1-10 (PC-10A) | 2.7 | translucent 1) | A | −700 | −20 | 0.84 | 10 |
| Comparative 1-1 (PC-11A) | 71.3 | non-transparent 2) | B | −660 | −50 | 1.20 | 30 |
| Comparative 1-2 (PC-12A) | 0.3 | transparent | C | −720 | −10 | 0.82 | 10 |

1) When this solution was put in a sample glass, a transmission image was clearly confirmed although having a little white turbidity.
2) When this solution was put in a sample glass, a transmission image was not confirmed because of white turbidity.

<Example(s) of Second Embodiment>

A copolymerized PC was manufactured by conducting ternary polycondensation with use of a PDMS monomer represented by the formula (6B) and a bisphenol monomer (a combination of bisphenol compounds and biphenol compounds), and an electrophotographic photoreceptor was manufactured from the copolymerized PC. Subsequently, various evaluations were conducted.

The description about preparation of oligomer and haze measurement in Examples in the second exemplary embodiment will be omitted, which is the same as that in Examples in the first exemplary embodiment.

Example 2-1

Manufacturing of Copolymerized PC

In a reaction vessel equipped with a stifling motor, a stirring blade and baffle plate, PCO-A (96 mL) was added with methylene chloride (354 mL) to adjust the solid content concentration at 0.06 kg/L in the methylene chloride. To this solution, 0.3 g of polydimethysiloxane (PDMS monomer) having aromatic hydroxy groups at both terminals that was synthesized by reacting polydimethysiloxane having SiH groups at both terminals with eugenol under the presence of a platinum catalyst, and 0.36 g of p-tert-butylphenol (PTBP) as a terminal terminator were added and fully stirred for mixing. PDMS monomer represented by the formula (6B) in which n1 was 3, repeating units (n2, PDMS chain length) of dimethylsiloxane part was 158, and R was a methyl group was used.

After 30 mL of 2N aqueous sodium hydroxide separately prepared was added in this solution, 1 mL of triethylamine solution (7 vol %) was added with stirring. After 10 minutes, the whole amount of a monomer solution separately prepared was added to this solution and kept on stirring for another one hour. Here, the monomer solution was prepared by cooling 120 mL of 2N aqueous sodium hydroxide to the room temperature or less, adding 0.1 g of $Na_2S_2O_4$ and 7 g of 4,4'-biphenol (BP) and completely dissolving the added components.

The obtained reaction mixture was diluted with 2 L of methylene chloride and 1 L of water and washed. A lower layer was separated from the reaction mixture. Then, the lower layer reaction mixture was washed with 1 L of water for one time, with 1 L of 0.1N aqueous sodium hydroxide for one time, with 1 L of 0.01N hydrochloric acid for one time and with 1 L of water for three times in this order. The obtained methylene chloride solution was dropped into methanol with stirring. The obtained redeposit was filtered and dried to prepare a copolymerized PC(PC-1B).

(Evaluation of Copolymerized PC)

PC-1B was dissolved in methylene chloride to prepare a solution having a concentration of 0.5 g/dl. When reduced viscosity [$\eta_{sp}/C$] thereof at 20 degrees C. was measured, the result was 1.14 dl/g. A chemical structure of the PC-1B was analyzed with $^1$H-NMR, and the PC-1A was found to be a copolymerized PC represented by the following formula (8B). The following repeating units of a ternary copolymer are respectively denoted as a bisphenols unit, biphenol unit and polysiloxane unit. A mass fraction of the polysiloxane unit in the PC-1B was 1 mass %. A viscosity average molecular weight of PC-1B was 50000 in calculation from the above reduced viscosity. PC-1B was dissolved at a concentration of 10 mass % in THF to prepare a solution. White turbidity thereof was visually observed and a haze of the solution was measured. The results are shown in Table 2.

[Chemical Formula 33]

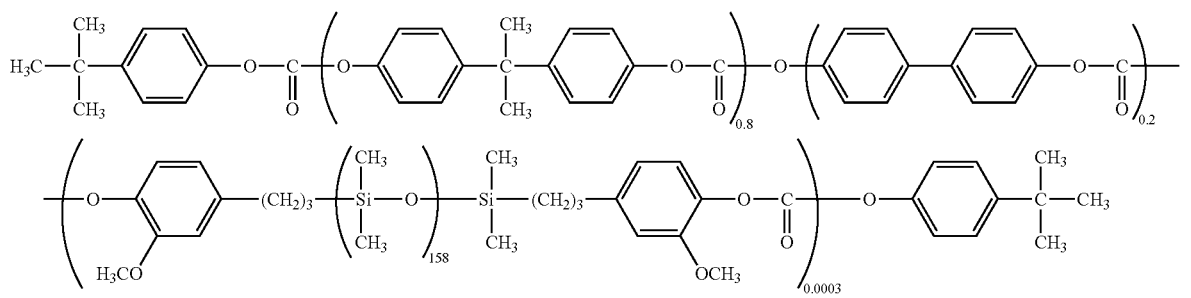

(8A)

(Manufacturing of Electrophotographic Photoreceptor)

An electrophotographic photoreceptor was manufactured in the same manner as in Example 1-1 of the first exemplary embodiment except for using the copolymerized polycarbonate resin (PC-1B) obtained above.

(Evaluation of Electrophotographic Photoreceptor)

The same evaluation as Example 1-1 of the first exemplary embodiment was conducted on the electrophotographic photoreceptor by using PC-1B.

Table 2 shows evaluation results of Example 2-1, Examples 2-2 to 2-10 described below and Comparatives 2-1 and 2-2.

Example 2-2

A copolymerized PC(PC-2B) was produced in the same manner as in Example 2-1, except that a content of PCO-A was changed from 96 mL to 241 mL and a content of methylene chloride was changed to 209 mL to adjust the solid content concentration at 0.15 kg/L in the methylene chloride; and a content of BP, PDMS chain length, a content of PDMS monomer and PTBP were respectively changed to 18 g, 58, 1.0 g and 0.81 g. [$\eta_{sp}/C$] of PC-2B was 1.18 dl/g and viscosity average molecular weight thereof was 52000. A mole ratio of a bisphenol unit, a biphenol unit and a polysiloxane unit in PC-2B was 0.8:0.2:0.001. A mass fraction of the polysiloxane unit in the PC-2B was 1 mass %.

The same evaluation as in Example 2-1 was conducted on the PC-2B and an electrophotographic photoreceptor made of the PC-2B in the same manner as in Example 2-1.

Example 2-3

A copolymerized PC(PC-3B) was produced in the same manner as in Example 2-1, except that PCO-A (96 mL) was changed to PCO-Z (260 mL) and a content of methylene chloride was changed to 190 mL to adjust the solid content concentration at 0.15 kg/L in the methylene chloride; and a content of BP, PDMS chain length, a content of PDMS monomer and PTBP were respectively changed to 12 g, 58, 2.3 g and 0.40 g. [$\eta_{sp}/C$] of PC-3B was 1.16 dl/g and viscosity average molecular weight thereof was 51000. A mole ratio of a bisphenol unit, a biphenol unit and a polysiloxane unit in PC-3B was 0.8:0.15:0.002. A mass fraction of the polysiloxane unit in the PC-3B was 3 mass %.

The same evaluation as in Example 2-1 was conducted on the PC-3B and an electrophotographic photoreceptor made of the PC-3B in the same manner as in Example 2-1.

Example 2-4

A copolymerized PC(PC-4B) was produced in the same manner as in Example 2-1, except that PCO-A (96 mL) was changed to PCO-Z (173 mL) and a content of methylene chloride was changed to 277 mL to adjust the solid content concentration at 0.10 kg/L in the methylene chloride; and a content of BP, PDMS chain length, a content of PDMS monomer and PTBP were respectively changed to 8 g, 91, 1.5 g and 0.27 g. [$\eta_{sp}/C$] of PC-4B was 1.19 dl/g and viscosity average molecular weight thereof was 52000. A mole ratio of a bisphenol unit, a biphenol unit and a polysiloxane unit in PC-4B was 0.85:0.15:0.002. A mass fraction of the polysiloxane unit in the PC-4B was 3 mass %.

The same evaluation as in Example 2-1 was conducted on the PC-4B and an electrophotographic photoreceptor made of the PC-4B in the same manner as in Example 2-1.

Example 2-5

A copolymerized PC(PC-5B) was produced in the same manner as in Example 2-1, except that PCO-A (96 mL) was changed to PCO-Z (104 mL) and a content of methylene chloride was changed to 346 mL to adjust the solid content concentration at 0.06 kg/L in the methylene chloride; and a content of BP, PDMS chain length, a content of PDMS monomer and PTBP were respectively changed to 5 g, 158, 0.9 g and 0.16 g. [$\eta_{sp}$/C] of PC-5B was 1.15 dl/g and viscosity average molecular weight thereof was 50000. A mole ratio of a bisphenol unit, a biphenol unit and a polysiloxane unit in PC-5B was 0.85:0.15:0.001. A mass fraction of the polysiloxane unit in the PC-5B was 3 mass %.

The same evaluation as in Example 2-1 was conducted on the PC-5B and an electrophotographic photoreceptor made of the PC-5B in the same manner as in Example 2-1.

Example 2-6

A copolymerized PC(PC-6B) was produced in the same manner as in Example 2-1, except that PCO-A (96 mL) was changed to PCO-E (173 mL) and a content of methylene chloride was changed to 277 mL to adjust the solid content concentration at 0.10 kg/L in the methylene chloride; and a content of 9,9-bis(3-methyl-4-hydroxyphenyl) fluorene in place of BP, PDMS chain length, a content of PDMS and PTBP were respectively changed to 23 g, 97, 1.3 g and 0.27 g. [$\eta_{sp}$/C] of PC-6B was 1.63 dl/g and viscosity average molecular weight thereof was 71000. A mole ratio of a bisphenol unit, a biphenol unit and a polysiloxane unit in PC-6B was 0.8:0.2:0.002. A mass fraction of the polysiloxane unit in the PC-6B was 2 mass %.

The same evaluation as in Example 2-1 was conducted on the PC-6B and an electrophotographic photoreceptor made of the PC-6B in the same manner as in Example 2-1.

Example 2-7

A copolymerized PC(PC-7B) was produced in the same manner as in Example 2-1, except that PCO-A (96 mL) was changed to PCO-B (173 mL) and a content of methylene chloride was changed to 277 mL to adjust the solid content concentration at 0.10 kg/L in the methylene chloride; and a content of 9,9-bis(3-methyl-4-hydroxyphenyl) fluorene in place of BP, PDMS chain length, a content of PDMS and PTBP were respectively changed to 26 g, 80, 0.7 g and 1.10 g. [$\eta_{sp}$/C] of PC-7B was 0.56 dl/g and viscosity average molecular weight thereof was 23000. A mole ratio of a bisphenol unit, a biphenol unit and a polysiloxane unit in PC-7B was 0.8:0.2:0.0005. A mass fraction of the polysiloxane unit in the PC-7B was 1 mass %.

The same evaluation as in Example 2-1 was conducted on the PC-7B and an electrophotographic photoreceptor made of the PC-7B in the same manner as in Example 2-1.

Example 2-8

A copolymerized PC(PC-8B) was produced in the same manner as in Example 2-1, except that PCO-A (96 mL) was changed to PCO-C (150 mL) and a content of methylene chloride was changed to 300 mL to adjust the solid content concentration at 0.10 kg/L in the methylene chloride; and a content of 1,1-bis(4-hydroxyphenyl)1-phenylethane in place of BP, PDMS chain length, a content of PDMS and PTBP were respectively changed to 17 g, 80, 2.6 g and 0.35 g. [$\eta_{sp}$/C] of PC-8B was 0.71 dl/g and viscosity average molecular weight thereof was 30000. A mole ratio of a bisphenol unit, a biphenol unit and a polysiloxane unit in PC-8B was 0.8:0.2:0.003. A mass fraction of the polysiloxane unit in the PC-8B was 5 mass %.

The same evaluation as in Example 2-1 was conducted on the PC-8B and an electrophotographic photoreceptor made of the PC-8B in the same manner as in Example 2-1.

Example 2-9

A copolymerized PC(PC-9B) was produced in the same manner as in Example 2-1, except that PCO-A (96 mL) was changed to PCO-Z (52 mL) and a content of methylene chloride was changed to 398 mL to adjust the solid content concentration at 0.03 kg/L in the methylene chloride; and a content of BP, PDMS chain length, a content of PDMS monomer and PTBP were respectively changed to 2.4 g, 300, 0.5 g and 0.08 g. [$\eta_{sp}$/C] of PC-9B was 1.10 dl/g and viscosity average molecular weight thereof was 48000. A mole ratio of a bisphenol unit, a biphenol unit and a polysiloxane unit in PC-9B was 0.8:0.2:0.0004. A mass fraction of the polysiloxane unit in the PC-9B was 3 mass %.

The same evaluation as in Example 2-1 was conducted on the PC-9B and an electrophotographic photoreceptor made of the PC-9B in the same manner as in Example 2-1.

Example 2-10

A copolymerized PC(PC-10B) was produced in the same manner as in Example 2-1, except that PCO-A (96 mL) was changed to PCO-Z (52 mL) and a content of methylene chloride was changed to 398 mL to adjust the solid content concentration at 0.03 kg/L in the methylene chloride; and a content of BP, PDMS chain length, a content of PDMS monomer and PTBP were respectively changed to 2.4 g, 158, 0.5 g and 0.08 g. [$\eta_{sp}$/C] of PC-10B was 1.12 dl/g and viscosity average molecular weight thereof was 49000. A mole ratio of a bisphenol unit, a biphenol unit and a polysiloxane unit in PC-10B was 0.8:0.2:0.002. A mass fraction of the polysiloxane unit in the PC-10B was 3 mass %.

The same evaluation as in Example 2-1 was conducted on the PC-10B and an electrophotographic photoreceptor made of the PC-10B in the same manner as in Example 2-1.

Comparative 2-1

A copolymerized PC(PC-11B) was produced in the same manner as in Example 2-1, except that a content of PCO-A was changed from 96 mL to 289 mL and a content of methylene chloride was changed from 354 mL to 190 mL to adjust the solid content concentration at 0.18 kg/L in the methylene chloride; and a content of BP, PDMS chain length of PDMS monomer, a content of PDMS monomer and PTBP were respectively changed to 21.6 g, 39, 1.2 g and 0.97 g.

The same evaluation as in the example 2-1 was conducted on the PC-11B. [$\eta_{sp}$/C] of PC-11A was 1.18 dl/g and viscosity average molecular weight thereof was 52,000. A mole ratio of a bisphenol unit, a biphenol unit and a polysiloxane unit in PC-11B was 0.8:0.2:0.01. A mass fraction of the polysiloxane unit in the PC-11B was 1 mass %.

The same evaluation as in Example 2-1 was conducted on the PC-11B and an electrophotographic photoreceptor made of the PC-11B in the same manner as in Example 2-1.

Comparative 2-2

A copolymerized PC(PC-12B) was manufactured in the same manner as in Example 2-3 except that PDMS chain length was changed to 92. [$\eta_{sp}$/C] of PC-12B was 1.15 dl/g and viscosity average molecular weight thereof was 50400. A mole ratio of a bisphenol unit, a biphenol unit and a polysiloxane unit in PC-12B was 0.85:0.15:0.002. A mass fraction of the polysiloxane unit in the PC-12B was 3 mass %.

The same evaluation as in Example 2-1 was conducted on the PC-12B and an electrophotographic photoreceptor made of the PC-12B in the same manner as in Example 2-1.

[Evaluation Result]

Table 2 shows evaluation results of Examples 2-1 to 2-10 and Comparatives 2-1 and 2-2. As is understood from Examples 2-1 to 2-10, an electrophotographic photoreceptor using the copolymerized PC according to the invention as a binder resin exhibits excellent various electrical characteristics and scratch resistance. On the other hand, in Comparative 2-1, scratch resistance is poor since PDMS chain length is short. In Comparative 2-2, the THF solution is considerably whitened, so that dispersion of CTM-1 is deteriorated and an interfacial part generated by mal-dispersion becomes a trap-site at charge-transfer. As a result, Comparative 2-2 is poor in electrical characteristics. Specifically, in Table 2, since a minus value of the initial residual potential ($V_R$), the initial sensitivity ($E_{1/2}$), and increase in repeating residual potential ($\Delta V_R$) are large, clearness of electrophotographic image is deteriorated.

Example 3-1

Manufacturing of PC Resin

In a reaction vessel equipped with a stifling motor, a stirring blade and baffle plate, PCO-A (96 mL) was added with methylene chloride (354 mL) to adjust the solid content concentration at 0.06 kg/L in the methylene chloride.

Next, according to Manufacturing Example 2-1 described in paragraph [0051] of JP-A-7-173275, a mixing ratio between butyl lithium and hexamethylcyclotrisiloxane was changed to provide a siloxane chain length (Ts chain length) of 158 and a polydimethylsiloxane (hereinafter, referred to as Ts monomer) having an aromatic hydroxy group at one terminal was obtained. Z in the Ts monomer (see the formula (6C)) is a methylene chain having 3 carbon atoms.

To the PCO-A solution described above, 0.3 g of the Ts monomer and 0.36 g of p-tert-butylphenol (PTBP) as another terminal terminator were added and fully mixed with stifling.

After 30 mL of 2N aqueous sodium hydroxide separately prepared was added in this solution, 1 mL of triethylamine solution (7 vol %) was added with stirring. After 10 minutes, the whole amount of a monomer solution separately prepared was added to this solution and kept on stirring for another one hour. Here, the monomer solution was prepared by cooling 120 mL of 2N aqueous sodium hydroxide to the room temperature or less, adding 0.1 g of $Na_2S_2O_4$ and 7 g of 4,4'-biphenol (BP) and completely dissolving the added components.

The obtained reaction mixture was diluted with 2 L of methylene chloride and 1 L of water and washed. A lower layer was separated from the reaction mixture. Then, the

TABLE 2

| | Copolymerized PC | | Photographic Receptor | | | | |
|---|---|---|---|---|---|---|---|
| | Haze | White Turbidity Degree (Visually) | Scratch Resistance | Initial Surface Potential ($V_O$)(V) | Residual Potential ($V_R$)(V) | Initial Sensitivity ($E_{1/2}$)(Lux-sec) | Increase in Repeating Residual Potential ($\Delta V_R$) |
| Example 2-1 (PC-1B) | 0.6 | transparent | B | −720 | −10 | 0.82 | 10 |
| Example 2-2 (PC-2B) | 0.3 | transparent | B | −720 | −10 | 0.82 | 10 |
| Example 2-3 (PC-3B) | 0.3 | transparent | B | −720 | −10 | 0.82 | 10 |
| Example 2-4 (PC-4B) | 0.4 | transparent | A | −720 | −10 | 0.82 | 10 |
| Example 2-5 (PC-5B) | 0.6 | transparent | A | −720 | −10 | 0.82 | 10 |
| Example 2-6 (PC-6B) | 0.5 | transparent | A | −720 | −10 | 0.82 | 10 |
| Example 2-7 (PC-7B) | 0.3 | transparent | B | −720 | −10 | 0.82 | 10 |
| Example 2-8 (PC-8B) | 0.6 | transparent | B | −720 | −10 | 0.82 | 10 |
| Example 2-9 (PC-9B) | 3.1 | translucent 1) | A | −700 | −20 | 0.84 | 10 |
| Example 2-10 (PC-10B) | 2.4 | translucent 1) | A | −700 | −20 | 0.84 | 10 |
| Comparative 2-1 (PC-11B) | 0.3 | transparent | C | −720 | −10 | 0.82 | 10 |
| Comparative 2-2 (PC-12B) | 69.6 | non-transparent 2) | B | −660 | −50 | 1.20 | 30 |

1) When this solution was put in a sample glass, a transmission image was clearly confirmed although having a little white turbidity.
2) When this solution was put in a sample glass, a transmission image was not confirmed because of white turbidity.

<Example(s) of Third Embodiment>

A copolymerized PC was manufactured by conducting polycondensation with use of a bisphenol monomer (a combination of bisphenol compounds and biphenol compounds) and a polysiloxane monomer (terminal terminator) represented by the formula (6C). An electrophotographic photoreceptor was manufactured from the copolymerized PC. Subsequently, various evaluations were conducted.

The description about preparation of oligomer and haze measurement in Examples in the third exemplary embodiment will be omitted, which is the same as that in Examples in the first exemplary embodiment.

lower layer reaction mixture was washed with 1 L of water for one time, with 1 L of 0.1N aqueous sodium hydroxide for one time, with 1 L of 0.01N hydrochloric acid for one time and with 1 L of water for three times in this order. The obtained methylene chloride solution was dropped into methanol with stirring. The obtained redeposit was filtered and dried to prepare a PC resin (PC-1C).

(Evaluation of PC Resin)

Then, the PC-1C was dissolved in methylene chloride to prepare a solution having a concentration of 0.5 g/dl. When reduced viscosity [$\eta_{sp}$/C] thereof at 20 degrees C. was measured, the result was 1.14 dl/g. A chemical structure of the PC-1C was analyzed with $^1$H-NMR, and the PC-1C was found to be a PC resin represented by the following formula (8C). Hereinafter, the following repeating units of the PC resin are respectively denoted as a bisphenol unit, a biphenol unit and a polysiloxane unit. An example of the terminal group includes p-tert-butylphenyl group based on PTBP, which will be omitted in the formula (8C).

A mass fraction of the polysiloxane unit in the PC-1C was 1%. A viscosity average molecular weight of PC-1C was 50000 in calculation from the above reduced viscosity. PC-1C was dissolved at a concentration of 10 mass % in THF to prepare a solution. White turbidity thereof was visually observed and a haze of the solution was measured. The results are shown in Table 3.

[Chemical Formula 34]

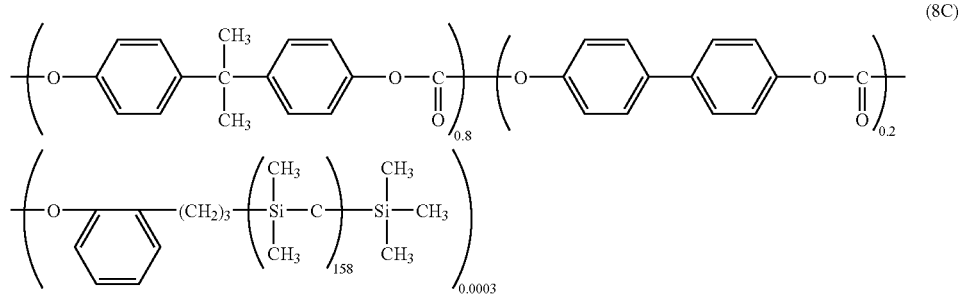

(8C)

(Manufacturing of Electrophotographic Photoreceptor)

An electrophotographic photoreceptor was manufactured in the same manner as in Example 1-1 of the first exemplary embodiment except for using the PC resin (PC-1C) obtained above.

(Evaluation of Electrophotographic Photoreceptor)

The same evaluation as Example 1-1 of the first exemplary embodiment was conducted on the electrophotographic photoreceptor by using PC-1C.

Table 3 shows evaluation results of Example 3-1, Examples 3-2 to 3-10 described below and Comparatives 3-1 and 3-2.

Example 3-2

A PC resin (PC-2C) was produced in the same manner as in Example 3-1, except that a content of PCO-A was changed from 96 mL to 241 mL and a content of methylene chloride was changed to 209 mL to adjust the solid content concentration at 0.15 kg/L in the methylene chloride; a content of BP, Ts chain length, a content of Ts monomer and PTBP were respectively changed to 18 g, 58, 1.0 g and 0.81 g; and the methylene chain (Z in the formula (6C)) in Ts monomer has 4 carbon atoms. $[\eta_{sp}/C]$ of PC-2C was 1.18 dl/g and viscosity average molecular weight thereof was 52000. A mole ratio of a bisphenol unit, a biphenol unit and a polysiloxane unit in PC-2C was 0.8:0.2:0.001. A mass fraction of the polysiloxane unit in the PC-2C was 1%. The same evaluation as in Example 3-1 was conducted on the PC-2C and an electrophotographic photoreceptor made of the PC-2C in the same manner as in Example 3-1.

Example 3-3

A PC resin (PC-3C) was produced in the same manner as in Example 3-1, except that PCO-A (96 mL) was changed to PCO-Z (260 mL) and a content of methylene chloride was changed to 190 mL to adjust the solid content concentration at 0.15 kg/L in the methylene chloride; and a content of BP, Ts chain length, a content of Ts monomer and PTBP were respectively changed to 12 g, 58, 2.3 g and 0.40 g. $[\eta_{sp}/C]$ of PC-3C was 1.16 dl/g and viscosity average molecular weight thereof was 51000. A mole ratio of a bisphenol unit, a biphenol unit and a polysiloxane unit in PC-3C was 0.85:0.15:0.002. A mass fraction of the polysiloxane unit in the PC-3C was 3%.

The same evaluation as in Example 3-1 was conducted on the PC-3C and an electrophotographic photoreceptor made of the PC-3C in the same manner as in Example 3-1.

Example 3-4

A PC resin (PC-4C) was produced in the same manner as in Example 3-1, except that PCO-A (96 mL) was changed to PCO-Z (173 mL) and a content of methylene chloride was changed to 277 mL to adjust the solid content concentration at 0.10 kg/L in the methylene chloride; and a content of BP, Ts chain length, a content of Ts monomer and PTBP were respectively changed to 8 g, 91, 1.5 g and 0.27 g. $[\eta_{sp}/C]$ of PC-4C was 1.19 dl/g and viscosity average molecular weight thereof was 52000. A mole ratio of a bisphenol unit, a biphenol unit and a polysiloxane unit in PC-4C was 0.85:0.15:0.001. A mass fraction of the polysiloxane unit in the PC-4C was 3%.

The same evaluation as in Example 3-1 was conducted on the PC-4C and an electrophotographic photoreceptor made of the PC-4C in the same manner as in Example 3-1.

Example 3-5

A PC resin (PC-5C) was produced in the same manner as in Example 3-1, except that PCO-A (96 mL) was changed to PCO-Z (104 mL) and a content of methylene chloride was changed to 346 mL to adjust the solid content concentration at 0.06 kg/L in the methylene chloride; a content of BP, Ts chain length, a content of Ts monomer and PTBP were respectively changed to 5 g, 158, 0.9 g and 0.16 g; and p-allylphenol was used in place of o-allylphenol to provide a binding position of methylene chain at the para-position. $[\eta_{sp}/C]$ of PC-5C was 1.15 dl/g and viscosity average molecular weight thereof was 50000. A mole ratio of a bisphenol unit, a biphenol unit and a polysiloxane unit in PC-5C was 0.85:0.15:0.001. A mass fraction of the polysiloxane unit in the PC-5C was 3%.

The same evaluation as in Example 3-1 was conducted on the PC-5C and an electrophotographic photoreceptor made of the PC-5C in the same manner as in Example 3-1.

Example 3-6

A PC resin (PC-6C) was produced in the same manner as in Example 3-1, except that PCO-A (96 mL) was changed to PCO-E (173 mL) and a content of methylene chloride was changed to 277 mL to adjust the solid content concentration at 0.10 kg/L in the methylene chloride; and a content of 9,9-bis (3-methyl-4-hydroxyphenyl) fluorene in place of BP, Ts chain length, a content of Ts monomer and PTBP were respectively changed to 2 3 g, 97, 1.3 g and 0.27 g. $[\eta_{sp}/C]$ of PC-6C was 1.63 dl/g and viscosity average molecular weight thereof was 71000. A mole ratio of a bisphenol unit, a biphenol unit and a polysiloxane unit in PC-6C was 0.8:0.2:0.002. A mass fraction of the polysiloxane unit in the PC-6C was 2%.

The same evaluation as in Example 3-1 was conducted on the PC-6C and an electrophotographic photoreceptor made of the PC-6C in the same manner as in Example 3-1.

Example 3-7

A PC resin (PC-7C) was produced in the same manner as in Example 3-1, except that PCO-A (96 mL) was changed to PCO-B (173 mL) and a content of methylene chloride was changed to 277 mL to adjust the solid content concentration at 0.10 kg/L in the methylene chloride; and a content of 9,9-bis (3-methyl-4-hydroxyphenyl) fluorene in place of BP, Ts chain length, a content of Ts monomer and PTBP were respectively changed to 26 g, 80, 0.7 g and 1.10 g. $[\eta_{sp}/C]$ of PC-7C was 0.56 dl/g and viscosity average molecular weight thereof was 23000. A mole ratio of a bisphenol unit, a biphenol unit and a polysiloxane unit in PC-7C was 0.8:0.2:0.0005. A mass fraction of the polysiloxane unit in the PC-7C was 1%.

The same evaluation as in Example 3-1 was conducted on the PC-7C and an electrophotographic photoreceptor made of the PC-7C in the same manner as in Example 3-1.

Example 3-8

A PC resin (PC-8C) was produced in the same manner as in Example 3-1, except that PCO-A (96 mL) was changed to PCO-C (150 mL) and a content of methylene chloride was changed to 300 mL to adjust the solid content concentration at 0.10 kg/L in the methylene chloride; and a content of 1,1-bis (4-hydroxyphenyl)1-phenylethane in place of BP, Ts chain length, a content of Ts monomer and PTBP were respectively changed to 17 g, 80, 2.6 g and 0.35 g. $[\eta_{sp}/C]$ of PC-8C was 0.71 dl/g and viscosity average molecular weight thereof was 30000. A mole ratio of a bisphenol unit, a biphenol unit and a polysiloxane unit in PC-8C was 0.8:0.2:0.003. A mass fraction of the polysiloxane unit in the PC-8C was 5%.

The same evaluation as in Example 3-1 was conducted on the PC-8C and an electrophotographic photoreceptor made of the PC-8C in the same manner as in Example 3-1.

Example 3-9

A PC resin (PC-9C) was produced in the same manner as in Example 3-1, except that PCO-A (96 mL) was changed to PCO-Z (52 mL) and a content of methylene chloride was changed to 398 mL to adjust the solid content concentration at 0.03 kg/L in the methylene chloride; and a content of BP, Ts chain length, a content of Ts monomer and PTBP were respectively changed to 2.4 g, 300, 0.5 g and 0.08 g. $[\eta_{sp}/C]$ of PC-9C was 1.10 dl/g and viscosity average molecular weight thereof was 48000. A mole ratio of a bisphenol unit, a biphenol unit and a polysiloxane unit in PC-9C was 0.8:0.2:0.0004. A mass fraction of the polysiloxane unit in the PC-9C was 3%.

The same evaluation as in Example 3-1 was conducted on the PC-9C and an electrophotographic photoreceptor made of the PC-9C in the same manner as in Example 3-1.

Example 3-10

A PC resin (PC-10C) was produced in the same manner as in Example 3-1, except that PCO-A (96 mL) was changed to PCO-Z (52 mL) and a content of methylene chloride was changed to 398 mL to adjust the solid content concentration at 0.03 kg/L in the methylene chloride; and a content of BP, Ts chain length, a content of Ts monomer and PTBP were respectively changed to 2.4 g, 158, 0.5 g and 0.08 g. $[\eta_{sp}/C]$ of PC-10C was 1.12 dl/g and viscosity average molecular weight thereof was 49000. A mole ratio of a bisphenol unit, a biphenol unit and a polysiloxane unit in PC-10C was 0.8:0.2: 0.0008. A mass fraction of the polysiloxane unit in the PC-10C was 3%.

The same evaluation as in Example 3-1 was conducted on the PC-10C and an electrophotographic photoreceptor made of the PC-10C in the same manner as in Example 3-1.

Comparative 3-1

A PC resin (PC-11C) was manufactured in the same manner as in Example 3-9 except that Ts chain length of Ts monomer was changed to 710.

The same evaluation as in Example 3-1 was conducted on the PC-11C. $[\eta_{sp}/C]$ of PC-11A was 1.12 dl/g and viscosity average molecular weight thereof was 49000. A mole ratio of a bisphenol unit, a biphenol unit and a polysiloxane unit in PC-11C was 0.8:0.2:0.0002. A mass fraction of the polysiloxane unit in the PC-11C was 3%.

Comparative 3-2

PC-12C was produced in the same manner as in Comparative 3-1, except that Ts monomer of Example 3-8 was changed to Ts monomer having Ts chain length of 20.

The same evaluation as in Example 3-1 was conducted on the PC-12C. $[\eta_{sp}/C]$ of PC-12C was 0.72 dl/g and viscosity average molecular weight thereof was 30000. A mole ratio of a bisphenol unit, a biphenol unit and a polysiloxane unit in PC-12C was 0.8:0.2:0.01. A mass fraction of the polysiloxane unit in the PC-12C was 1%.

[Evaluation Result]

Table 3 shows evaluation results of Examples 3-1 to 3-10 and Comparatives 3-1 and 3-2. As is understood from Examples 3-1 to 3-10, an electrophotographic photoreceptor using the PC resin according to the invention as a binder resin is excellent in electrical characteristics and scratch resistance. On the other hand, in Comparative 3-1, the THF solution is considerably whitened, so that dispersion of CTM-1 is deteriorated and an interfacial part generated by mal-dispersion becomes a trap-site at charge-transfer. As a result, Comparative 3-1 is inferior in electrical characteristics. Specifically, in Table 3, since a minus value of the initial residual potential ($V_R$), the initial sensitivity ($E_{1/2}$), and increase in repeating residual potential ($\Delta V_R$) are large, clearness of electrophotographic image is poor. In Comparative 3-2, scratch resistance is poor since Ts chain length is short.

TABLE 3

| | Copolymerized PC | | Photographic Receptor | | | | |
|---|---|---|---|---|---|---|---|
| | Haze | White Turbidity Degree (Visually) | Scratch Resistance | Initial Surface Potential ($V_O$)(V) | Residual Potential ($V_R$)(V) | Initial Sensitivity ($E_{1/2}$)(Lux-sec) | Increase in Repeating Residual Potential |
| Example 3-1 (PC-1C) | 0.5 | transparent | B | −720 | −10 | 0.82 | 10 |
| Example 3-2 (PC-2C) | 0.3 | transparent | B | −720 | −10 | 0.82 | 10 |
| Example 3-3 (PC-3C) | 0.3 | transparent | B | −720 | −10 | 0.82 | 10 |
| Example 3-4 (PC-4C) | 0.3 | transparent | A | −720 | −10 | 0.82 | 10 |
| Example 3-5 (PC-5C) | 0.5 | transparent | A | −720 | −10 | 0.82 | 10 |
| Example 3-6 (PC-6C) | 0.4 | transparent | A | −720 | −10 | 0.82 | 10 |
| Example 3-7 (PC-7C) | 0.3 | transparent | B | −720 | −10 | 0.82 | 10 |
| Example 3-8 (PC-8C) | 0.5 | transparent | B | −720 | −10 | 0.82 | 10 |
| Example 3-9 (PC-9C) | 2.3 | translucent 1) | A | −720 | −20 | 0.84 | 10 |
| Example 3-10 (PC-10C) | 1.9 | translucent 1) | A | −720 | −20 | 0.84 | 10 |
| Comparative 3-1 (PC-11C) | 65.2 | non-transparent 2) | B | −670 | −50 | 1.20 | 30 |
| Comparative 3-2 (PC-12C) | 0.3 | transparent | C | −720 | −10 | 0.82 | 10 |

1) When this solution was put in a sample glass, a transmission image was clearly confirmed although having a little white turbidity.
2) When this solution was put in a sample glass, a transmission image was not confirmed because of white turbidity.

The invention claimed is:

1. A polycarbonate polymer, comprising:
a monomer unit represented by a formula (1A) below; and
a monomer unit represented by a formula (2) below, wherein
a haze of a solution that is prepared by dissolving the polycarbonate polymer in THF (tetrahydrofuran) at a concentration of 10 mass % is 5% or less (according to JIS K7105, optical path length of 10 mm),

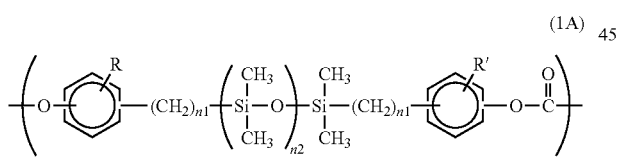
(1A)

where: R and R' each independently represent a hydrogen atom, a halogen atom, an alkyl group having 1 to 12 carbon atoms or a substituted or unsubstituted aryl group having 6 to 12 carbon atoms; n1 is an integer in a range of 2 to 4; and n2 is an integer in a range of 25 to 700; and

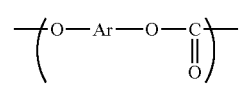
(2)

where: Ar represents a divalent aromatic group.

2. A polycarbonate polymer, comprising:
a monomer unit represented by a formula (1B) below; and
a monomer unit represented by a formula (2) below, wherein
a haze of a solution that is prepared by dissolving the polycarbonate polymer in THF (tetrahydrofuran) at a concentration of 10 mass % is 5% or less (according to JIS K7105, optical path length of 10 mm),

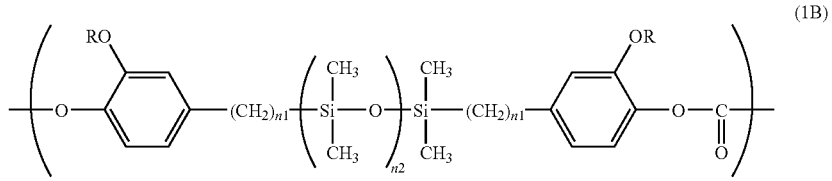
(1B)

where: R represents an alkyl group having 1 to 3 carbon atoms; n1 is an integer in a range of 2 to 4; and n2 is an integer in a range of 55 to 700; and

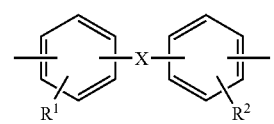
(2)

where: Ar represents a divalent aromatic group.

3. The polycarbonate polymer according to claim 1, wherein a haze of a solution that is prepared by dissolving the polycarbonate polymer in THF (tetrahydrofuran) at a concentration of 25 mass % is 10% or less.

4. The polycarbonate polymer according to claim 1, wherein Ar in the formula (2) comprises a functional group represented by formula (3A) below,

(3A)

where: $R^1$ and $R^2$ each independently represent a functional group selected from the group consisting of hydrogen, a trifluoromethyl group, a halogen atom, an alkyl group having 1 to 10 carbon atoms, an aryl group having 6 to 12 carbon atoms, a cycloalkyl group having 3 to 12 carbon atoms, an alkoxy group having 1 to 6 carbon atoms and an aryloxy group having 6 to 12 carbon atoms; and X represents a functional group selected from the group consisting of a single bond, —O—, —S—, —SO—, —SO$_2$—, —CO—, —CR$^3$R$^4$— (in which R$^3$ and R$^4$ each independently represent a functional group selected from the group consisting of a hydrogen atom, a trifluoromethyl group, a substituted or unsubstituted alkyl group having 1 to 10 carbon atoms and a substituted or and unsubstituted aryl group having 6 to 12 carbon atoms), a substituted or unsubstituted cycloalkylidene group having 5 to 11 carbon atoms, a substituted or unsubstituted α,ω-alkylene group having 2 to 12 carbon atoms, a substituted or unsubstituted 9,9-fluorenylidene group, a substituted or unsubstituted arylene group having 6 to 12 carbon atoms, a divalent functional group derived from terpenes represented by a formula (4A) below, and alkylidene-arylene-alkylidene group having 8 to 16 carbon atoms represented by a formula (5A) below,

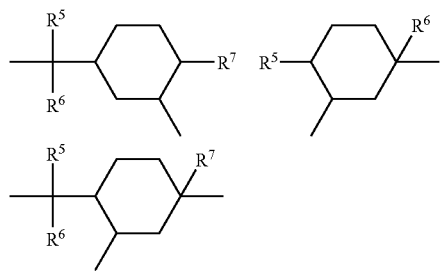
(4A)

where: R$^5$ to R$^7$ each represent the same functional group as R$^1$ and R$^2$, and

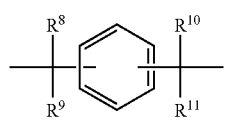
(5A)

where: R$^8$ to R$^{11}$ each represent the same functional group as R$^1$ and R$^2$.

5. The polycarbonate polymer according to claim 4, wherein X in the formula (3A) represents a functional group selected from the group consisting of —CR$^3$R$^4$—, a single bond, a substituted or unsubstituted cycloalkylidene group having 5 to 11 carbon atoms and a substituted or unsubstituted 9,9-fluorenylidene group.

6. The polycarbonate polymer according to claim 4, wherein the functional group represented by the above formula (3A) is (A) a combination of a functional group in which X is a single bond and a functional group in which X is not a single bond, (B) a combination of a functional group in which X is a substituted or unsubstituted cycloalkylidene group having 5 to 11 carbon atoms and a functional group in which X is other than a substituted or unsubstituted cycloalkylidene group having 5 to 11 carbon atoms, (C) a combination of a functional group in which X is a substituted or unsubstituted 9,9-fluorenylidene group and a functional group in which X is other than a substituted or unsubstituted 9,9-fluorenylidene group or (D) a combination of a functional group in which X is an alkylidene-arylene-alkylidene group having 8 to 16 carbon atoms and a functional group in which X is other than an alkylidene-arylene-alkylidene group having 8 to 16 carbon atoms.

7. The polycarbonate polymer according to claim 1, wherein the monomer unit represented by the formula (1A) or (1B) occupies 0.01 to 50 mass % in the total polycarbonate polymer.

8. A polycarbonate polymer, comprising:
a monomer unit represented by a formula (2) below, comprising: a structure in which at least one terminal is terminated by a terminal group represented by a formula (1C) below,

(2)

where: Ar represents a divalent aromatic group; and

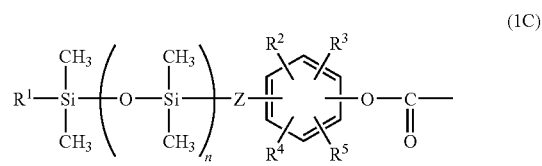
(1C)

where: Z represents an aliphatic hydrocarbon group having 2 to 6 carbon atoms; R$^1$ represents an aliphatic hydrocarbon group having 1 to 6 carbon atoms; R$^2$ to R$^5$ each independently represent a hydrogen atom, an aliphatic hydrocarbon group having 1 to 30 carbon atoms, an alkoxy group having 1 to 6 carbon atoms or an aromatic hydrocarbon group having 6 to 12 carbon atoms; and n is an integer in a range of 40 to 700.

9. The polycarbonate polymer according to claim 8, wherein a haze of a solution that is prepared by dissolving the polycarbonate polymer in THF (tetrahydrofuran) at a concentration of 10 mass % is 5% or less (according to JIS K7105, optical path length of 10 mm).

10. The polycarbonate polymer according to claim 8, wherein a haze of a solution that is prepared by dissolving the polycarbonate polymer in THF (tetrahydrofuran) at a concentration of 25 mass % is 10% or less.

11. The polycarbonate polymer according to claim 8, wherein Ar in the formula (2) comprises a functional group represented by a formula (3B) below,

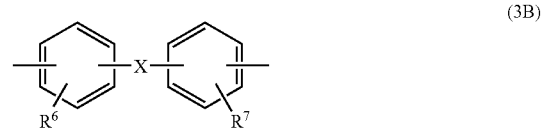
(3B)

where: R$^6$ and R$^7$ each independently represent a functional group selected from the group consisting of hydrogen, a trifluoromethyl group, a halogen atom, an alkyl group having 1 to 10 carbon atoms, an aryl group having 6 to 12 carbon atoms, a cycloalkyl group having 3 to 12 carbon atoms, an alkoxy group having 1 to 6 carbon atoms and an aryloxy group having 6 to 12 carbon atoms; and X represents a functional group selected from the group consisting of a single bond, —O—, —S—, —SO—, —SO$_2$—, —CO—, —CX$^1$X$^2$— (in which X$^1$ and X$^2$ each independently represent a functional group selected from the group consisting of a hydrogen atom, a trifluoromethyl group, a substituted or unsubstituted alkyl group having 1 to 10 carbon atoms and a substituted or unsubstituted aryl group having 6 to 12 carbon atoms), a substituted or unsubstituted cycloalkylidene group having 5 to 11 carbon atoms, a substituted or unsubstituted α,ω-alkylene group having 2 to 12 carbon atoms, a substituted or unsubstituted 9,9-fluorenylidene group, a substituted or unsubstituted arylene group having 6 to 12 carbon atoms, a divalent functional group derived from terpenes represented by a formula (4B) below, and alkylidene-arylene-alkylidene group having 8 to 16 carbon atoms represented by a formula (5B) below; however when X$^1$ and X$^2$ are both methyl groups, X is not —CX$^1$X$^2$— alone,

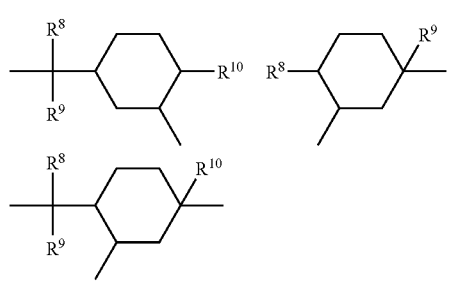

(4B)

where: R$^8$ to R$^{10}$ each represent the same functional group as R$^6$ and R$^7$; and

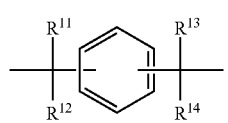

(5B)

where: R$^{11}$ to R$^{13}$ each represent the same functional group as R$^6$ and R$^7$.

12. The polycarbonate polymer according to claim 11, wherein X in the formula (3B) represents a functional group selected from the group consisting of —CHCH$_3$—, —C(CH$_3$)C$_2$H$_5$—, a single bond, a substituted or unsubstituted cycloalkylidene group having 5 to 11 carbon atoms and a substituted or unsubstituted 9,9-fluorenylidene group.

13. The polycarbonate polymer according to claim 11, wherein the functional group represented by the above formula (3B) is (A) a combination of a functional group in which X is a single bond and a functional group in which X is not a single bond, (B) a combination of a functional group in which X is a substituted or unsubstituted cycloalkylidene group having 5 to 11 carbon atoms and a functional group in which X is other than a substituted or unsubstituted cycloalkylidene group having 5 to 11 carbon atoms, (C) a combination of a functional group in which X is a substituted or unsubstituted 9,9-fluorenylidene group and a functional group in which X is other than a substituted or unsubstituted 9,9-fluorenylidene group or (D) a combination of a functional group in which X is an alkylidene-arylene-alkylidene group having 8 to 16 carbon atoms and a functional group in which X is other than an alkylidene-arylene-alkylidene group having 8 to 16 carbon atoms.

14. The polycarbonate polymer according to claim 8, wherein the terminal group represented by the formula (1C) occupies 0.01 to 50 mass % in the total polycarbonate polymer.

15. A coating liquid, comprising: the polycarbonate polymer according to claim 1; and a solvent.

16. An electrophotographic photoreceptor, comprising the polycarbonate polymer according to claim 1.

17. The polycarbonate polymer according to claim 2, wherein a haze of a solution that is prepared by dissolving the polycarbonate polymer in THF (tetrahydrofuran) at a concentration of 25 mass % is 10% or less.

18. The polycarbonate polymer according to claim 2, wherein Ar in the formula (2) comprises a functional group represented a formula (3A) below,

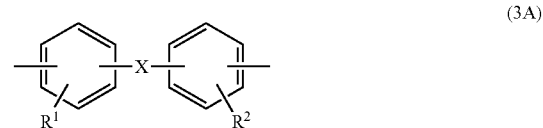

(3A)

where: R$^1$ and R$^2$ each independently represent a functional group selected from the group consisting of hydrogen, a trifluoromethyl group, a halogen atom, an alkyl group having 1 to 10 carbon atoms, an aryl group having 6 to 12 carbon atoms, a cycloalkyl group having 3 to 12 carbon atoms, an alkoxy group having 1 to 6 carbon atoms and an aryloxy group having 6 to 12 carbon atoms; and X represents a functional group selected from the group consisting of a single bond, —O—, —S—, —SO—, —SO$_2$—, —CO—, —CR$^3$R$^4$— (in which R$^3$ and R$^4$ each independently represent a functional group selected from the group consisting of a hydrogen atom, a trifluoromethyl group, a substituted or unsubstituted alkyl group having 1 to 10 carbon atoms and a substituted or and unsubstituted aryl group having 6 to 12 carbon atoms), a substituted or unsubstituted cycloalkylidene group having 5 to 11 carbon atoms, a substituted or unsubstituted α,ω-alkylene group having 2 to 12 carbon atoms, a substituted or unsubstituted 9,9-fluorenylidene group, a substituted or unsubstituted arylene group having 6 to 12 carbon atoms, a divalent functional group derived from terpenes represented by a formula (4A) below, and alkylidene-arylene-alkylidene group having 8 to 16 carbon atoms represented by a formula (5A) below,

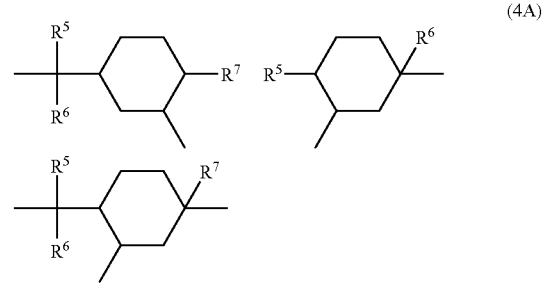

(4A)

where: $R^5$ to $R^7$ each represent the same functional group as $R^1$ and $R^2$, and

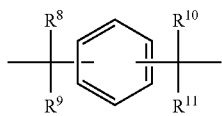 (5A)

where: $R^8$ to $R^{11}$ each represent the same functional group as $R^1$ and $R^2$.

19. The polycarbonate polymer according to claim 18, wherein X in the formula (3A) represents a functional group selected from the group consisting of —$CR^3R^4$—, a single bond, a substituted or unsubstituted cycloalkylidene group having 5 to 11 carbon atoms and a substituted or unsubstituted 9,9-fluorenylidene group.

20. The polycarbonate polymer according to claim 18, wherein the functional group represented by the above formula (3A) is (A) a combination of a functional group in which X is a single bond and a functional group in which X is not a single bond, (B) a combination of a functional group in which X is a substituted or unsubstituted cycloalkylidene group having 5 to 11 carbon atoms and a functional group in which X is other than a substituted or unsubstituted cycloalkylidene group having 5 to 11 carbon atoms, (C) a combination of a functional group in which X is a substituted or unsubstituted 9,9-fluorenylidene group and a functional group in which X is other than a substituted or unsubstituted 9,9-fluorenylidene group or (D) a combination of a functional group in which X is an alkylidene-arylene-alkylidene group having 8 to 16 carbon atoms and a functional group in which X is other than an alkylidene-arylene-alkylidene group having 8 to 16 carbon atoms.

21. The polycarbonate polymer according to claim 2, wherein the monomer unit represented by the formula (1A) or (1B) occupies 0.01 to 50 mass % in the total polycarbonate polymer.

22. A coating liquid, comprising: the polycarbonate polymer according to claim 2; and a solvent.

23. An electrophotographic photoreceptor, comprising the polycarbonate polymer according to claim 2.

24. A coating liquid, comprising: the polycarbonate polymer according to claim 8; and a solvent.

25. An electrophotographic photoreceptor, comprising the polycarbonate polymer according to claim 8.

* * * * *

UNITED STATES PATENT AND TRADEMARK OFFICE
CERTIFICATE OF CORRECTION

PATENT NO. : 8,207,288 B2
APPLICATION NO. : 12/599078
DATED : June 26, 2012
INVENTOR(S) : Takaaki Hikosaka It is certified that error appears in the above-identified patent and that said Letters Patent is hereby corrected as shown below:

Column 55, Line 12 reads: "and a substituted or and unsubstituted aryl group having" should read --and a substituted or unsubstituted aryl group having--.

Column 58, Line 42 reads: "and a substituted or and unsubstituted aryl group having" should read --and a substituted or unsubstituted aryl group having--.

Signed and Sealed this
Eleventh Day of September, 2012

David J. Kappos
*Director of the United States Patent and Trademark Office*